(12) United States Patent
Wilson

(10) Patent No.: US 7,596,767 B2
(45) Date of Patent: Sep. 29, 2009

(54) SYSTEM AND PROCESS FOR CONTROLLING ELECTRONIC COMPONENTS IN A UBIQUITOUS COMPUTING ENVIRONMENT USING MULTIMODAL INTEGRATION

(75) Inventor: Andrew Wilson, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 573 days.

(21) Appl. No.: 11/156,873

(22) Filed: Jun. 17, 2005

(65) Prior Publication Data

US 2005/0257173 A1 Nov. 17, 2005

Related U.S. Application Data

(63) Continuation of application No. 10/160,659, filed on May 31, 2002, now Pat. No. 6,990,639.

(60) Provisional application No. 60/355,368, filed on Feb. 7, 2002.

(51) Int. Cl.
*G06F 3/033* (2006.01)
(52) U.S. Cl. .................. 715/863; 715/866; 715/771
(58) Field of Classification Search ................. 715/863, 715/866, 771; 704/275, 270.1; 709/207
See application file for complete search history.

(56) References Cited

U.S. PATENT DOCUMENTS

| | | |
|---|---|---|
| 5,177,311 A | 1/1993 | Suzuki et al. |
| 5,181,181 A | 1/1993 | Glynn |
| 5,454,043 A | 9/1995 | Freeman |
| 5,528,263 A | 6/1996 | Platzker et al. |
| 5,600,765 A | 2/1997 | Ando |
| 5,719,622 A | 2/1998 | Conway |
| 5,748,186 A | 5/1998 | Raman |
| 5,825,350 A | 10/1998 | Case et al. |

(Continued)

FOREIGN PATENT DOCUMENTS

EP 0357909 A1 3/1990

(Continued)

OTHER PUBLICATIONS

Savidis et al., Design User-Adapted Interfaces: The Unified Design Method for Transformable Interactions, pp. 323-334, 1997 ACM.*

(Continued)

*Primary Examiner*—Tadeese Hailu
(74) *Attorney, Agent, or Firm*—Shook, Hardy & Bacon L.L.P.

(57) ABSTRACT

The present invention is directed toward a system and process that controls a group of networked electronic components using a multimodal integration scheme in which inputs from a speech recognition subsystem, gesture recognition subsystem employing a wireless pointing device and pointing analysis subsystem also employing the pointing device, are combined to determine what component a user wants to control and what control action is desired. In this multimodal integration scheme, the desired action concerning an electronic component is decomposed into a command and a referent pair. The referent can be identified using the pointing device to identify the component by pointing at the component or an object associated with it, by using speech recognition, or both. The command may be specified by pressing a button on the pointing device, by a gesture performed with the pointing device, by a speech recognition event, or by any combination of these inputs.

12 Claims, 20 Drawing Sheets

U.S. PATENT DOCUMENTS

| | | | |
|---|---|---|---|
| 5,878,274 | A | 3/1999 | Kono et al. |
| 5,884,249 | A | 3/1999 | Namba et al. |
| 5,920,024 | A | 7/1999 | Moore |
| 6,021,403 | A | 2/2000 | Horvitz et al. |
| 6,053,814 | A | 4/2000 | Pchenitchnikov |
| 6,111,580 | A | 8/2000 | Kazama et al. |
| 6,150,947 | A | 11/2000 | Shima |
| 6,241,609 | B1 | 6/2001 | Rutgers |
| 6,300,933 | B1 | 10/2001 | Nagasaki |
| 6,312,335 | B1 | 11/2001 | Tosaki et al. |
| 6,344,861 | B1 | 2/2002 | Naughton et al. |
| 6,345,111 | B1 | 2/2002 | Yamaguchi et al. |
| 6,369,794 | B1 | 4/2002 | Sakurai |
| 6,469,633 | B1 | 10/2002 | Wachter |
| 6,499,025 | B1 | 12/2002 | Horvitz et al. |
| 6,502,082 | B1 * | 12/2002 | Toyama et al. ............... 706/16 |
| 6,517,438 | B2 | 2/2003 | Tosaki et al. |
| 6,601,055 | B1 | 7/2003 | Roberts |
| 6,720,949 | B1 | 4/2004 | Pryor |
| 6,744,420 | B2 | 6/2004 | Mohri |
| 6,894,716 | B1 | 5/2005 | Harrington |
| 6,918,829 | B2 | 7/2005 | Ikariko |
| 6,931,384 | B1 * | 8/2005 | Horvitz et al. ............... 706/45 |
| 6,949,024 | B2 | 9/2005 | Kaku et al. |
| 7,028,269 | B1 * | 4/2006 | Cohen-Solal et al. ....... 715/863 |
| 7,036,462 | B2 | 5/2006 | Cohen |
| 7,137,126 | B1 * | 11/2006 | Coffman et al. ............ 719/328 |
| 7,183,480 | B2 | 2/2007 | Nishitani et al. |
| 2002/0004422 | A1 | 1/2002 | Tosaki |
| 2002/0157116 | A1 * | 10/2002 | Jasinschi ................... 725/136 |
| 2007/0091084 | A1 | 4/2007 | Ueshima |

FOREIGN PATENT DOCUMENTS

| | | |
|---|---|---|
| EP | 0919906 A2 | 2/1999 |
| EP | 0919906 A2 | 6/1999 |
| WO | 9519031 A1 | 7/1995 |
| WO | WO-9519031 A1 | 7/1995 |
| WO | WO-9803907 | 1/1998 |
| WO | 9942920 A1 | 8/1999 |
| WO | WO-9942920 A1 | 8/1999 |
| WO | WO-0073995 A2 | 12/2000 |
| WO | 0169365 A1 | 9/2001 |
| WO | WO-0169365 A1 | 9/2001 |
| WO | WO-0215560 A2 | 2/2002 |

OTHER PUBLICATIONS

Oviatt, S., et al., Integration and Synchronization of Input Modes during Multimodal Human-Computer Interaction, .CHI 97, Atlanta, GA, ACM Press, 1997, 415-422.*

Richard A. Bolt, "Put-That-There": Voice and Gesture at the Graphics interface, ACM Press, 1980, 262-270.*

Moore et al., Exploiting Human Actions and Object Context for Recognition Tasks, presented at the 7th IEEE International Conference on Computer Vision, Corfu, Greece Sep. 20-27, 1999.*

Barry Brumitt & JJ Cadiz, "let there be light!" Comparing Interfaces for Homes of the Future, Sep. 21, 2000.*

Marcelo Kallmann et al., Direct 3D Interaction with Smart Objects, ACM 1999.*

Kohler, M.R.J. System architecture and techniques for gesture recognition in unconstraint environments, Proc. of the 1997 Int. Conf. on Virtual Systems and MultiMedia (VSMM'97), Geneva, Sep. 10-12, 1997, pp. 137-146.

Fukumoto, M., Y. Suenaga, K. Mase, "Finger-Pointer": Pointing interface by image processing, Computers & Graphics, 1994, p. 633-642, vol. 18, No. 5.

Pavlovic, V. I., R. Sharma, and T. S. Huang, Visual interpretation of hand gestures for human-computer interaction: A review, IEEE Transactions on Pattern Analysis and Machine Intelligence, Jul. 1997, pp. 677-695, vol. 19, No. 7.

European Search Report, Application No. 03002829.4-2415, Date of Completion: Oct. 30. 2007, Date of Mailing Nov. 7, 2007.

Aimone, C., R. Fung, A. Khisti, M. Varia, The head mounted control system, University of Toronto CSIDC Competition Submission, May 2001.

Fisher, R.B., A.P. Ashbrook, C. Robertson, N. Werghi, A low-cost range finder using a visually located, structured light source, Proc. 2nd Int'l Conf. on 3-D Digital Imaging and Modeling, Oct. 1999, pp. 24-33, Ottawa, Canada.

Jojic, N., B. Brummitt, B. Meyers, S. Harris, and T. Huang, Detection and estimation of pointing gestures in dense disparity maps, IEEE Int'l, Conf. on Automatic Face and Gesture Recognition, 2000, Grenbole, France.

McKenzie, M. K., J. L. Alty, Integrating speech and two-dimensional gesture input—A study of redundancy between modes, Proc. of Comp. Human Interaction Conf., Nov. 30-Dec. 4, 1998, pp. 6-13, Dept. of Comput. Studies, Loughborough Univ. of Technol.

Olsen, D. R. J., T. Nielsen, Laser pointer interaction, Proc. CHI 2001, Human Factors in Computing Systems, 2001, pp. 17-22.

Oviatt, S., Mutual disambiguation of recognition errors in a multimodal architecture, Proc. of the CHI '99 Conference on Human Factors in Computing Systems, 1999, pp. 576-583, ACM Press.

Oviatt, S. L., Taming speech recognition errors within a multimodal interface, Communications of the ACM, pp. 45-51, vol. 43, No. 9, pp. 45-51, Sep. 2000.

Priyantha, N. B., A. Chakraborty, H. Balakrishnan, The cricket location-support system, Proc. 6th ACM MOBICOM, Boston, MA, 2000.

Rabiner, L. R., and B.-J. Juang, An introduction to hidden markov models. IEEE ASSP Magazine, Jan. 1986, pp. 4-15.

Randell, C., and H. Muller, Low cost indoor positioning system, Ubicomp 2001: Ubiquitous Computing, pp. 42-48, Springer-Verlag, Atlanta, Georgia, Sep. 30-Oct. 2, 2001.

Starner, T., J. Auxier, D. Ashbrook, M. Gandy, The gesture pendant: A self-illuminating, wearable, infrared computer vision system for home automation control and medical monitoring, Int'l Symposium on Wearable Comp., 2000, pp. 87-94, IEEE Comp. Soc., Atlanta, GA.

Wexelblat, A., An approach to natural gesture in virtual environments, ACM Transactions on Computer-Human Interaction (TOCHI), vol. 2; No. 3, Sep. 1995, pp. 179-200, ACM Press, New York, NY.

Tadesse, H., Office Action, Mar. 16, 2005, pp. 1-12.

Fisher, R.B., A.P. Ashbrook, C. Robertson, N. Werghi, A low-cost range finder using a visually located, structured light source, Division of Informatics, Edinburgh University.

Masaaki, Fukomoto, et al.: "Finger-Pointer: Pointing Interface by Image Processing," Computers and Graphics, Pergamon Press Ltd., Oxford, GB, vol. 18, No. 5, Sep. 1, 1994, pp. 633-642, XP000546603, ISSN: 0097-8493 *the whole document*.

Masui, T. and I. Siio, Real-world graphical user interface, Proceedings of the Internatioinal Symposium on Handheld and Ubiquitous Computing (HUC2000, Sep. 2000, pp. 72084.

Michael Johnston and Srinivas Bangalore, "Finite-state Multomedia Parsing and Understanding," AT&T Labs-Research Shannon Laboratory, Jul. 2000.

Pavlovic, V. I., et al.: "Visual Interpretation of Hand Gestures for Human-Computer Interaction: A Review," IEEE Transactions on Pattern Analysis and Machine Intelligence, IEEE Service Center, Los Alamitos, CA, US, vol. 19, No. 7, Jul. 1997, pp. 677-695, XP000698168. ISSN: 0162-8828.

Pearl, J. Probabilistic Reasoning in Intelligent Systems, Morgan Kaufmann, San Mateo, California, 1988.

Swindells, C., K. Inkpen, J. Dill, M. Tory, That one there! Pointing to establish device identify, Proceedings of the 15th Annual ACM Symposium on User Interface Software and Technology, 2002 Paris, pp. 151-160.

Kohler, M.R.J. System Architecture and Techniques for Gesture Recognition in Unconstraint Environments, Proc. Of the 1997 Int. Conf. on Virtual Systems and Multimedia (VSMM'97), Geneva, Sep. 10-12, 1997, pp. 137-146.

* cited by examiner

SYSTEM AND PROCESS FOR CONTROLLING ELECTRONIC COMPONENTS IN A UBIQUITOUS COMPUTING ENVIRONMENT USING MULTIMODAL INTEGRATION

CROSS-REFERENCE TO RELATED APPLICATIONS

This application is a continuation of a prior application entitled "A SYSTEM AND PROCESS FOR CONTROLLING ELECTRONIC COMPONENTS IN A UBIQUITOUS COMPUTING ENVIRONMENT USING MULTIMODAL INTEGRATION", which was assigned Ser. No. 10/160,659 and filed May 31, 2002, now U.S. Pat. No. 6,990,639 and which claims the benefit of a previously filed provisional patent application Ser. No. 60/355,368, filed on Feb. 7, 2002.

BACKGROUND

1. Technical Field

The invention is related to controlling electronic components in a ubiquitous computing environment, and more particularly to a system and process for controlling the components using multimodal integration in which inputs from a speech recognition subsystem, gesture recognition subsystem employing a wireless pointing device and pointing analysis subsystem associated with the pointing device, are combined to determine what component a user wants to control and what control action is desired.

2. Background Art

Increasingly our environment is populated with a multitude of intelligent devices, each specialized in function. The modern living room, for example, typically features a television, amplifier, DVD player, lights, and so on. In the near future, we can look forward to these devices becoming more inter-connected, more numerous and more specialized as part of an increasingly complex and powerful integrated intelligent environment. This presents a challenge in designing good user interfaces.

For example, today's living room coffee table is typically cluttered with multiple user interfaces in the form of infrared (IR) remote controls. Often each of these interfaces controls a single device. Tomorrow's intelligent environment presents the opportunity to present a single intelligent user interface (UI) to control many such devices when they are networked. This UI device should provide the user a natural interaction with intelligent environments. For example, people have become quite accustomed to pointing at a piece of electronic equipment that they want to control, owing to the extensive use of IR remote controls. It has become almost second nature for a person in a modern environment to point at the object he or she wants to control, even when it is not necessary. Take the small radio frequency (RF) key fobs that are used to lock and unlock most automobiles in the past few years as an example. Inevitably, a driver will point the free end of the key fob toward the car while pressing the lock or unlock button. This is done even though the driver could just have well pointed the fob away from the car, or even pressed the button while still in his or her pocket, owing to the RF nature of the device. Thus, a single UI device, which is pointed at electronic components or some extension thereof (e.g., a wall switch to control lighting in a room) to control these components, would represent an example of the aforementioned natural interaction that is desirable for such a device.

There are some so-called "universal" remote controls on the market that are preprogrammed with the known control protocols of a litany of electronic components, or which are designed to learn the command protocol of an electronic component. Typically, such devices are limited to one transmission scheme, such as IR or RF, and so can control only electronic components operating on that scheme. However, it would be desirable if the electronic components themselves were passive in that they do not have to receive and process commands from the UI device directly, but would instead rely solely on control inputs from the aforementioned network. In this way, the UI device does not have to differentiate among various electronic components, say by recognizing the component in some manner and transmitting commands using some encoding scheme applicable only to that component, as is the case with existing universal remote controls.

Of course, a common control protocol could be implemented such that all the controllable electronic components within an environment use the same control protocol and transmission scheme. However, this would require all the electronic components to be customized to the protocol and transmission scheme, or to be modified to recognize the protocol and scheme. This could add considerably to the cost of a "single UI-controlled" environment. It would be much more desirable if the UI device could be used to control any networked group of new or existing electronic components regardless of remote control protocols or transmission schemes the components were intended to operate under.

Another current approach to controlling a variety of different electronic components in an environment is through the use of speech recognition technology. Essentially, a speech recognition program is used to recognize user commands. Once recognized the command can be acted upon by a computing system that controls the electronic components via a network connection. However, current speech recognition-based control systems typically exhibit high error rates. Although speech technology can perform well under laboratory conditions, a 20%-50% decrease in recognition rates can be experienced when these systems are used in a normal operating environment. This decrease in accuracy occurs for the most part because of the unpredictable and variable noise levels found in a normal operating setting, and the way humans alter their speech patterns to compensate for this noise. In fact, environmental noise is currently viewed as a primary obstacle to the widespread commercialization of speech recognition systems.

It is noted that in the preceding paragraphs, as well as in the remainder of this specification, the description refers to various individual publications identified by a numeric designator contained within a pair of brackets. For example, such a reference may be identified by reciting, "reference [1]" or simply "[1]". Multiple references will be identified by a pair of brackets containing more than one designator, for example, [2, 3]. A listing of references including the publications corresponding to each designator can be found at the end of the Detailed Description section.

SUMMARY

The present invention is directed toward a system and process that controls a group of networked electronic components regardless of any remote control protocols or transmission schemes under which they operate. In general this is accomplish using a multimodal integration scheme in which inputs from a speech recognition subsystem, gesture recognition subsystem employing a wireless pointing device and pointing analysis subsystem also employing the pointing device, are combined to determine what component a user wants to control and what control action is desired.

In order to control one of the aforementioned electronic components, the component must first be identified to the control system. In general this can be accomplished using the pointing system to identify the desired component by pointing at it, or by employing speech recognition, or both. The advantage of using both is to reinforce the selection of a particular component, even in a noisy environment where the speech recognition system may operate poorly. Thus, by combining inputs the overall system is made more robust. This use of divergent inputs to reinforce the selection is referred to as multimodal integration.

Once the object is identified, the electronic device can be controlled by the user informing the computer in some manner what he or she wants the device to do. This may be as simple as instructing the computer to turn the device on or off by activating a switch or button on the pointer. However, it is also desirable to control devices in more complex ways than merely turning them on or off. Thus, the user must have some way of relaying the desired command to the computer. One such way would be through the use of voice commands interpreted by the speech recognition subsystem. Another way is by having the user perform certain gestures with the pointer that the computer will recognize as particular commands. Integrating these approaches is even better as explained previously.

In regard to the user performing certain gestures with the pointer to remotely convey a command, this can be accomplished in a variety of ways. One approach involves matching a sequence of sensor values output by the pointer and recorded over a period of time, to stored prototype sequences each representing the output of the sensor that would be expected if the pointer were manipulated in a prescribed manner. This prescribed manner is the aforementioned gesture.

The stored prototype sequences are generated in a training phase for each electronic component it is desired to control via gesturing. Essentially to teach a gesture to the electronic component control system that represents a particular control action for a particular electronic component, a user simply holds down the pointer's button while performing the desired gesture. Meanwhile the electronic component control process is recording particular sensor values obtained from orientation messages transmitted by the pointer during the time the user is performing the gesture. The recorded sensor values represent the prototype sequence.

During operation, the control system constantly monitors the incoming orientation messages once an object associated with a controllable electronic component has been selected to assess whether the user is performing a control gesture. As mentioned above, this gesture recognition task is accomplished by matching a sequence of sensor values output by the pointer and recorded over a period of time, to stored prototype sequences representing the gestures taught to the system.

It is noted however, that a gesture made by a user during runtime may differ from the gesture preformed to create the prototype sequence in terms of speed or amplitude. To handle this situation, the matching process can entails not only comparing a prototype sequence to the recorded sensor values but also comparing the recorded sensor values to various versions of the prototype that are scaled up and down in amplitude and/or warped in time. Each version of the a prototype sequence is created by applying a scaling and/or warping factor to the prototype sequence. The scaling factors scale each value in the prototype sequence either up or down in amplitude. Whereas, the warping factors expand or contract the overall prototype sequence in time. Essentially, a list is established before initiating the matching process which includes every combination of the scaling and warping factors possible, including the case where one or both of the scaling and warping factors are zero (thus corresponding to the unmodified prototype sequence).

Given this prescribed list, each prototype sequence is selected in turn and put through a matching procedure. This matching procedure entails computing a similarity indicator between the input sequence and the selected prototype sequence. The similarity indicator can be defined in various conventional ways. However, in tested versions of the control system, the similarity indicator was obtained by first computing a "match score" between corresponding time steps of the input sequence and each version of the prototype sequence using a standard Euclidean distance technique. The match scores are averaged and the maximum match score is identified. This maximum match score is the aforementioned similarity indicator for the selected prototype sequence. Thus, the aforementioned variations in the runtime gestures are considered in computing the similarity indicator. When a similarity indicator has been computed for every prototype sequence it is next determined which of the similarity indicators is the largest. The prototype sequence associated with the largest similarity indicator is the best match to the input sequence, and could indicate the gesture associated with that sequence was performed. However, unless the similarity is great enough, it might be that the pointer movements are random and do not match any of the trained gestures. This situation is handled by ascertaining if the similarity indicator of the designated prototype sequence exceeds a prescribed similarity threshold. If the similarity indicator exceeds the threshold, then it is deemed that the user has performed the gesture associated with that designated prototype sequence. As such, the control action corresponding to that gesture is initiated by the host computer. If the similarity indicator does not exceed the threshold, no control action is initiated. The foregoing process is repeated continuously for each block of sensor values obtained from the incoming orientation messages having the prescribed length.

In regard to the use of simple and short duration gestures, such as for example a single upwards or downwards motion, an opportunity exists to employ a simplified approach to gesture recognition. For such gestures, a recognition strategy can be employed that looks for simple trends or peaks in one or more of the sensor values output by the pointer. For example, pitching the pointer up may be detected by simply thresholding the output of the accelerometer corresponding to pitch. Clearly such an approach will admit many false positives if run in isolation. However, in a real system this recognition will be performed in the context on an ongoing interaction, during which it will be clear to system (and to the user) when a simple pitch up indicates the intent to control a device in a particular way. For example, the system may only use the gesture recognition results if the user is also pointing at an object, and furthermore only if the particular gesture applies to that particular object. In addition, the user can be required to press and hold down the pointer's button while gesturing. Requiring the user to depress the button while gesturing allows the system to easily determine when a gesture begins. In other words, the system records sensor values only after the user depresses the button, and thus gives a natural origin from which to detect trends in sensor values. In the context of gesturing while pointing at an object, this process induces a local coordinate system around the object, so that "up", "down", "left" and "right" are relative to where the object appears to the user. For example, "up" in the context of a standing user pointing at an object on the floor means pitching up from a pitched down position, and so on.

As discussed above, a system employing multimodal integration would have a distinct advantage over one system alone. To this end, the present invention includes the integration of a conventional speech control system into the gesture control and pointer systems which results in a simple framework for combining the outputs of various modalities such as pointing to target objects and pushing the button on the pointer, pointer gestures, and speech, to arrive at a unified interpretation that instructs a combined environmental control system on an appropriate course of action. This framework decomposes the desired action into a command and referent pair. The referent can be identified using the pointer to select an object in the environment as described previously or using a conventional speech recognition scheme, or both. The command may be specified by pressing the button on the pointer, or by a pointer gesture, or by a speech recognition event, or any combination thereof.

The identity of the referent, the desired command and the appropriate action are all determined by the multimodal integration of the outputs of the speech recognition system, gesture recognition system and pointing analysis processes using a dynamic Bayes network. Specifically, the dynamic Bayes network includes input, referent, command and action nodes. The input nodes correspond to the aforementioned inputs and are used to provide state information to at least one of either the referent, command, or action node. The states of the inputs determine the state of the referent and command nodes, and the states of the referent and command nodes are in turn fed into the action node, whose state depends in part on these inputs and in part on a series of device state input nodes. The state of the action node indicates the action that is to be implemented to affect the referent. The referent, command and action node states comprise probability distributions indicating the probability that each possible referent, command and action is the respective desired referent, command and action.

In addition, the dynamic Bayes network preserves ambiguities from one time step to the next while waiting for enough information to become available to make a decision as to what referent, command or action is intended. This is done via a temporal integration technique in which probabilities assigned to referents and commands in the last time step are brought forward to the current time step and are input along with new speech, pointing and gesture inputs to influence the probability distribution computed for the referents and commands in the current time step. In this way the network tends to hold a memory of a command and referent, and it is thus unnecessary to specify the command and referent at exactly the same moment in time. It is also noted that the input from these prior state nodes is weighted such that their influence on the state of the referent and command nodes decreases in proportion to the amount of time that has past since the prior state node first acquired its current state.

The Bayes network architecture also allows the state of various devices to be incorporated via the aforementioned device state input nodes. In particular, these nodes provide state information to the action node that reflects the current condition of an electronic component associated with the device state input node whenever the referent node probability distribution indicates the referent is that component. This allows, as an example, the device state input nodes to input an indication of whether the associated electronic component is activated or deactivated. This can be quite useful in situations where the only action permitted in regard to an electronic component is to turn it off if it is on, and to turn it on if it is off. In such a situation, an explicit command need not be determined. For example if the electronic component is a lamp, all that need be known is that the referent is this lamp and that it is on or off. The action of turning the lamp on or off, as the case may be, follows directly, without the user ever having to command the system.

DESCRIPTION OF THE DRAWINGS

The specific features, aspects, and advantages of the present invention will become better understood with regard to the following description, appended claims, and accompanying drawings where:

FIG. 12C depicts the difference image derived from a pair of consecutive images generated by the camera that captured the image of FIG. 12A and where FIG. 12D depicts the difference image derived from a pair of consecutive images generated by the camera that captured the image of FIG. 12B. The difference images attenuate background IR leaving the pointer's IR LED flash as the predominant feature of the image.

DETAILED DESCRIPTION OF THE PREFERRED EMBODIMENTS

In the following description of the preferred embodiments of the present invention, reference is made to the accompanying drawings which form a part hereof, and in which is shown by way of illustration specific embodiments in which the invention may be practiced. It is understood that other embodiments may be utilized and structural changes may be made without departing from the scope of the present invention.

In general, the present electronic component control system and process involves the integration of a unique wireless pointer-based object selection system, a unique gesture recognition system that employs the wireless pointer, and a conventional speech control system to create a multimodal interface for determining what component a user wants to control and what control action is desired.

The pointer-based object selection system will be described first in the sections to follow, followed by the gesture recognition system, and finally the integration of these systems with a conventional speech recognition system to form the present electronic component control system.

1.0 OBJECT SELECTION USING A WIRELESS POINTER

Figure 1:
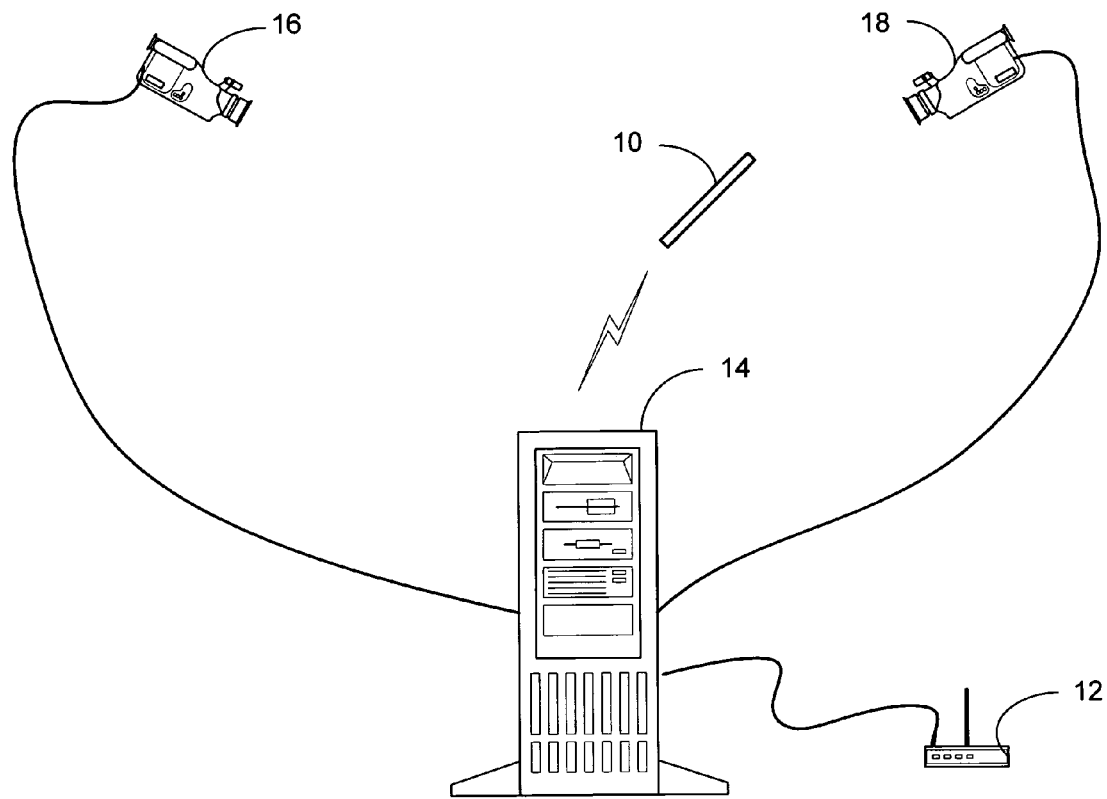
FIG. 1 is a diagram depicting an object selection system according to the present invention.

In general, the present multimodal interface control system requires an object selection system that is capable of allowing a user to point a pointing device (referred to as a pointer) at an object in the environment that is, or is associated with, an electronic component that is controllable by the control system, and by computing the orientation and location of the pointer in terms of the environment's pre-defined coordinate system, can determine that the user is pointing at the object. Any object selection system meeting the foregoing criteria can be used. One such system is the subject of a U.S. patent application entitled "A SYSTEM AND PROCESS FOR SELECTING OBJECTS IN A UBIQUITOUS COMPUTING ENVIRONMENT", having a Ser. No. of 10/160,692, and a filing date of May 31, 2002. Referring to FIG. 1, the object selection system described in the co-pending application employs a wireless pointer 10, which is pointed by a user at an object in the surrounding environment (such as a room) that the user wishes to affect. For example, the user might point the device 10 at a lamp with the intention of turning the lamp on or off. The wireless pointer 10 transmits data messages to a RF transceiver base station 12, which is in communication with a host computer 14, such as a personal computer (PC). In tested versions of the object selection system, communications between the base station 12 and the host computer 14 were accomplished serially via a conventional RS232 communication interface. However, other communication interfaces can also be employed as desired. For example, the communications could be accomplished using a Universal System Bus (USB), or IEEE 1394 (Firewire) interface, or even a wireless interface. The base station 12 forwards data received from the pointer 10 to the host computer 14 when a data message is received. The host computer 14 then computes the current 3D orientation of the pointer 10 from the aforementioned received data. The process used for this computation will be described in detail later.

The object selection system also includes components for determining the 3D location of the pointer 10. Both the orientation and location of the pointer within the environment in which it is operating are needed to determine where the user is pointing the device. In tested embodiments of the system these components included a pair of video cameras 16, 18 with infrared-pass filters. These cameras 16, 18 are mounted at separate locations within the environment such that each images the portion of the environment where the user will be operating the pointer 10 from a different viewpoint. A wide angle lens can be used for this purpose if necessary. Each camera 16, 18 is also connected via any conventional wireless or wired pathway to the host computer 14, so as to provide image data to the host computer 14. In tested embodiments of the system, the communication interface between the each camera 16, 18 and the host computer 14 was accomplished using a wired IEEE 1394 (i.e., Firewire) interface. The process by which the 3D location of the pointer 10 is determined using the image data provided from the cameras 16, 18 will also be discussed in detail later.

Figure 2:
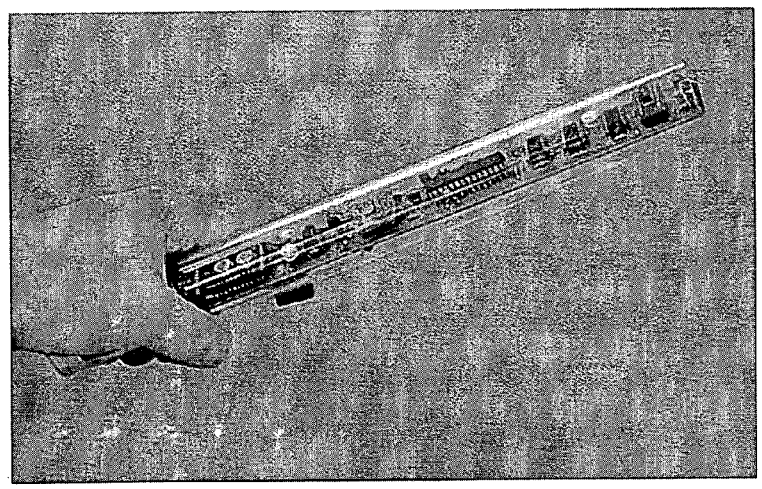
FIG. 2 is an image depicting one version of the wireless RF pointer employed in the object selection system of FIG. 1, where the case is transparent revealing the electronic component within.

The aforementioned wireless pointer is a small hand-held unit that in the tested versions of the object selection system resembled a cylindrical wand, as shown in FIG. 2. However, the pointer can take on many other forms as well. In fact the pointer can take on any shape that is capable of accommodating the internal electronics and external indicator lights and actuators associated with the device—although preferably the chosen shape should be amenable to being pointed with a readily discernable front or pointing end. Some examples of possible alternate shapes for the pointer would include one resembling a remote control unit for a stereo or television, or one resembling an automobile key fob, or one resembling a writing pen.

Figure 3:
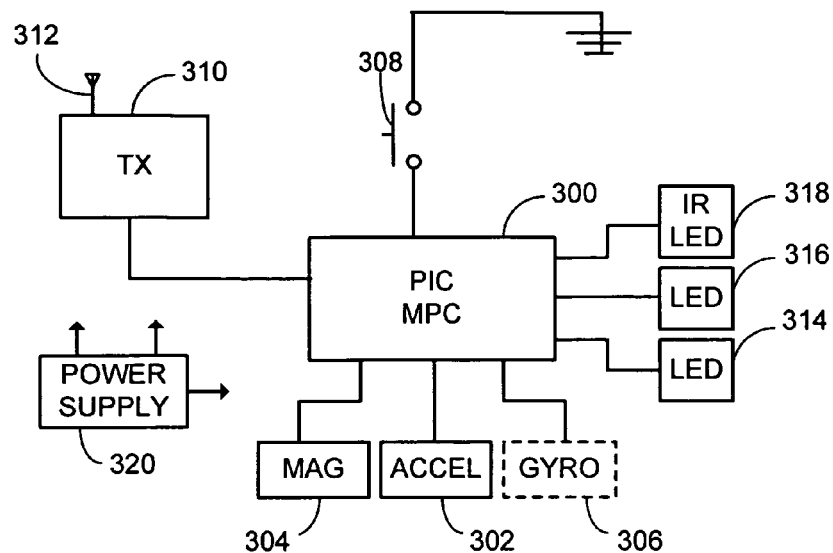
FIG. 3 is a block diagram illustrating the internal components included in one version of the wireless RF pointer employed in the object selection system of FIG. 1.

In general, the wireless pointer is constructed from a case having the desired shape, which houses a number of off-the-shelf electronic components. Referring to the block diagram of FIG. 3, the general configuration of these electronic components will be described. The heart of the pointer is a PIC microcontroller 300 (e.g., a PIC 16F873 20 MHz Flash programmable microcontroller), which is connected to several other components. For example, the output of an accelerometer 302, which produces separate x-axis and y-axis signals (e.g., a 2-axis MEMs accelerometer model number ADXL202 manufactured by Analog Devices, Inc. of Norwood Mass.) is connected to the microcontroller 300. The output of a magnetometer 304 (e.g., a 3-axis magnetoresistive permalloy film magnetometer model number HMC1023 manufactured by Honeywell SSEC of Plymouth, Minn.), which produces separate x, y and z axis signals, is also connected to the microcontroller 300, as can be an optional single axis output of a gyroscope 306 (e.g., a 1-axis piezoelectric gyroscope model number ENC-03 manufactured by Murata Manufacturing Co., Ltd. of Kyoto, Japan). The block representing the gyroscope in FIG. 3 has dashed lines to indicate it is an optional component.

There is also at least one manually-operated switch connected to the microcontroller 300. In the tested versions of the wireless pointer, just one switch 308 was included, although more switches could be incorporated depending on what functions it is desired to make available for manual activation or deactivation. The included switch 308 is a push-button switch; however any type of switch could be employed. In general, the switch (i.e., button) 308 is employed by the user to tell the host computer to implement some function. The particular function will be dependent on what part of the object selection system process is currently running on the host computer. For example, the user might depress the button to signal to the host computer that user is pointing at an object he or she wishes to affect (such as turning it on or off if it is an electrical device), when the aforementioned process is in an object selection mode. A transceiver 310 with a small antenna 312 extending therefrom, is also connected to and controlled by the microcontroller 300. In tested versions of the pointer, a 418 MHz, 38.4 kbps bidirectional, radio frequency transceiver was employed.

Additionally, a pair of visible spectrum LEDs 314, 316, is connected to the microcontroller 300. Preferably, these LEDs each emit a different color of light. For example, one of the LEDs 314 could produce red light, and the other 316 could produce green light. The visible spectrum LEDs 314, 316 can be used for a variety of purposes preferably related to providing status or feedback information to the user. In the tested versions of the object selection system, the visible spectrum LEDs 314, 316 were controlled by commands received from the host computer via the base station transceiver. One example of their use involves the host computer transmitting a command via the base station transceiver to the pointer instructing the microcontroller 300 to illuminate the green LED 316 when the device is being pointed at an object that the host computer is capable of affecting, and illuminating the red LED when it is not. In addition to the pair of visible LEDs, there is an infrared (IR) LED 318 that is connected to and controlled by the microcontroller 300. The IR LED can be located at the front or pointing end of the pointer. It is noted that unless the case of the pointer is transparent to visible and/or IR light, the LEDs 314, 316, 318 whose light emissions would be blocked are configured to extend through the case of the pointer so as to be visible from the outside. It is further noted that a vibration unit such as those employed in pagers could be added to the pointer so that the host computer could activate the unit and thereby attract the attention of the user, without the user having to look at the pointer.

A power supply 320 provides power to the above-described components of the wireless pointer. In tested versions of the pointer, this power supply 320 took the form of batteries. A regulator in the power supply 320 converts the battery voltage to 5 volts for the electronic components of the pointer. In tested versions of the pointer about 52 mA was used when running normally, which decreases to 1 mA when the device is in a power saving mode that will be discussed shortly.

Tested versions of the wireless pointer operate on a command-response protocol between the device and the base station. Specifically, the pointer waits for a transmission from the base station. An incoming transmission from the base station is received by the pointer's transceiver and sent to the microcontroller. The microcontroller is pre-programmed with instructions to decode the received messages and to determine if the data contains an identifier that is assigned to the pointer and which uniquely identifies the device. This identifier is pre-programmed into the microcontroller. If such an identifier is found in the incoming message, then it is deemed that the message is intended for the pointer. It is noted that the identifier scheme allows other devices to be contacted by the host computer via the base station. Such devices could even include multiple pointers being operated in the same environment, such as in an office. In the case where multiple pointer are in use in the same environment, the object selection process which will be discussed shortly can be running as multiple copies (one for each pointer) on the same host computer, or could be running on separate host computers. Of course, if there are no other devices operating in the same environment, then the identifier could be eliminated and every message received by the pointer would be assumed to be for it. The remainder of the data message received can include various commands from the host computer, including a request to provided orientation data in a return transmission. In tested versions of the object selection system, a request for orientation data was transmitted 50 times per second (i.e., a rate of 50 Hz). The microcontroller is pre-programmed to recognize the various commands and to take specific actions in response.

Figure 4:
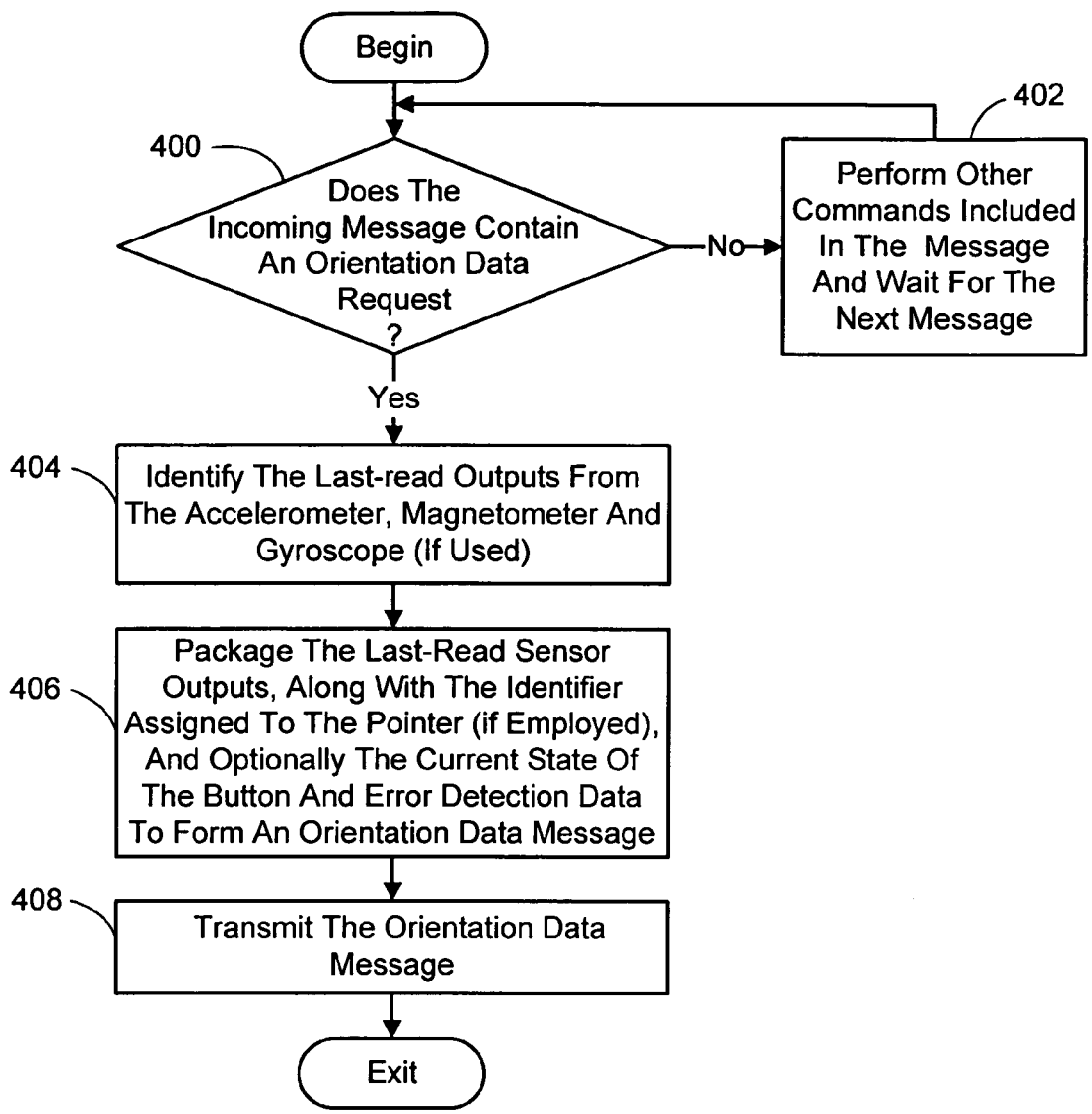
FIG. 4 is a flow chart diagramming a process performed by the pointer to package and transmit orientation data messages.

For example, in the case where an incoming data message to the pointer includes a request for orientation data, the microcontroller would react as follows. Referring to the flow diagram in FIG. 4, the microcontroller first determines if the incoming data message contains an orientation data request command (process action 400). If not, the microcontroller performs any other command included in the incoming data message and waits for the next message to be received from the base station (process action 402). If, however, the microcontroller recognizes an orientation data request command, in process action 404 it identifies the last-read outputs from the accelerometer, magnetometer and optionally the gyroscope (which will hereafter sometimes be referred to collectively as "the sensors"). These output values, along with the identifier assigned to the pointer (if employed), and optionally the current state of the button and error detection data (e.g., a checksum value), are packaged by the microcontroller into an orientation data message (process action 406). The button state is used by the host computer of the system for various purposes, as will be discussed later. The orientation data message is then transmitted via the pointer's transceiver to the base station (process action 408), which passes the data on to the host computer. The aforementioned orientation message data can be packaged and transmitted using any appropriate RF transmission protocol.

It is noted that while tested versions of the object selection system used the above-described polling scheme where the pointer provided the orientation data message in response to a transmitted request, this need not be the case. For example, alternately, the microcontroller of the pointer could be programmed to package and transmit an orientation message on a prescribed periodic basis (e.g., at a 50 Hz rate).

The aforementioned base station used in the object selection system will now be described. In one version, the base station is a small, stand-alone box with connections for DC power and communications with the PC, respectively, and an external antenna. In tested versions of the object selection system, communication with the PC is done serially via a RS232 communication interface. However, other communication interfaces can also be employed as desired. For example, the PC communications could be accomplished using a Universal System Bus (USB), or IEEE 1394 (Firewire) interface, or even a wireless interface. The antenna is designed to receive 418 MHz radio transmissions from the pointer.

Figure 5:
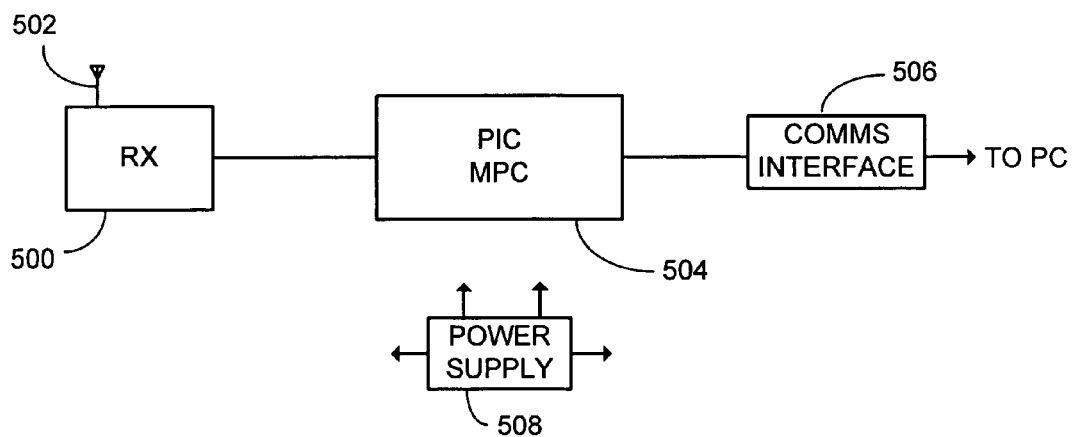
FIG. 5 is a block diagram illustrating the internal components included in one version of the RF base station employed in the object selection system of FIG. 1.

Referring now to the block diagram of FIG. 5, the general construction of the RF transceiver base station will be described. The antenna 502 sends and receives data message signals. In the case of receiving a data message from the pointer, the radio frequency transceiver 500 demodulates the received signal for input into a PIC microcontroller 504. The microcontroller 504 provides an output representing the received data message each time one is received, as will be described shortly. A communication interface 506 converts microcontroller voltage levels to levels readable by the host computer. As indicated previously, the communication interface in tested versions of the base station converts the microcontroller voltage levels to RS232 voltages. Power for the base station components is provided by power supply 508, which could also be battery powered or take the form of a separate mains powered AC circuit.

It is noted that while the above-described version of the base station is a stand-alone unit, this need not be the case. The base station could be readily integrated into the host computer itself. For example, the base station could be configured as an expansion card which is installed in an expansion slot of the host computer. In such a case only the antenna need be external to the host computer.

Figure 6:
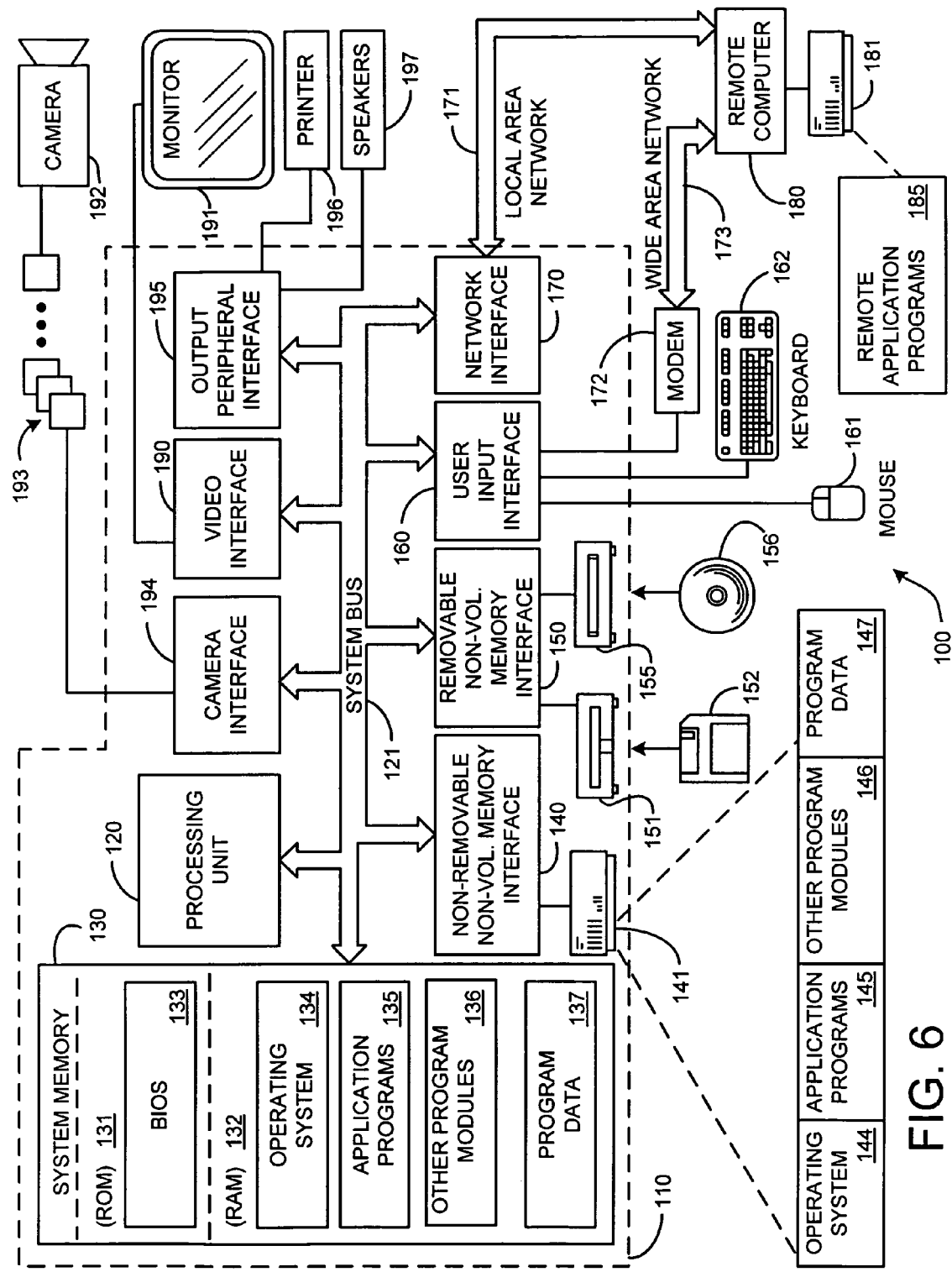
FIG. 6 is a diagram depicting a general purpose computing device constituting an exemplary system for implementing the host computer of the present invention.

The base station is connected to the host computer, as described previously. Whenever an orientation data message is received from the pointer it is transferred to the host computer for processing. However, before providing a description of this processing, a brief, general description of a suitable computing environment in which this processing may be implemented and of the aforementioned host computer, will be described in more detail. It is noted that this computing environment is also applicable to the other processes used in the present electronic component control system, which will be described shortly. FIG. 6 illustrates an example of a suitable computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The object selection process is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like (which are collectively be referred to as computers or computing devices herein).

The object selection process may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 6, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 6 illustrates operating system 134, application programs 135, other program modules 136, and program data 137.

The computer 110 may also include other removable/non-removable, volatile/nonvolatile computer storage media. By way of example only, FIG. 6 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 6, provide storage of computer readable instructions, data structures, program modules and other data for the computer 110. In FIG. 6, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointer 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. Further, a camera 163 (such as a digital/electronic still or video camera, or film/photographic scanner) capable of capturing a sequence of images 164 can also be included as an input device to the personal computer 110. While just one camera is depicted, multiple cameras could be included as input devices to the personal computer 110. The images 164 from the one or more cameras are input into the computer 110 via an appropriate camera interface 165. This interface 165 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 163.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 6. The logical connections depicted in FIG. 6 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 6 illustrates remote application programs 185 as residing on memory device 181. It will be appreciated that the network connections shown are exemplary and other means of establishing a communications link between the computers may be used.

Figure 7:
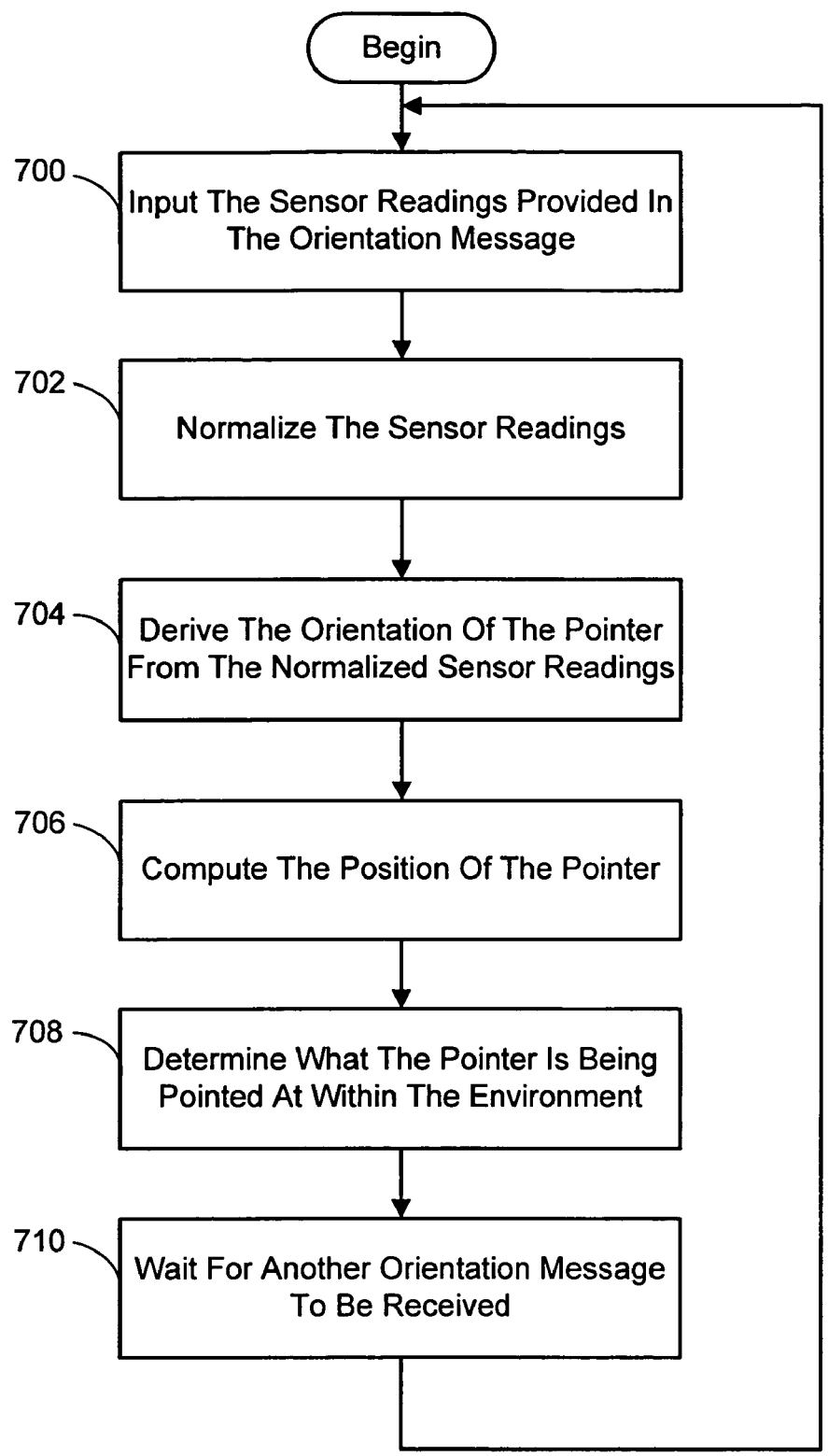
FIG. 7 is a flow chart diagramming an overall process for selecting an object using the object selection system of FIG. 1.

The exemplary operating environment having now been discussed, the remaining part of this description section will be devoted to a description of the program modules embodying the object selection process performed by the host computer. Generally, referring to FIG. 7, the object selection process begins by inputting the raw sensor readings provided in an orientation message forwarded by the base station (process action 700). These sensor readings are normalized (process action 702) based on factors computed in a calibration procedure, and then combined to derive the full 3D orientation of the pointer (process action 704). Then, the 3D location of the pointer in the environment in which it is operating is computed (process action 706). Once the orientation and location of the pointer is known, the object selection process determines what the pointer is being pointed at within the environment (process action 708), so that the object can be affected in some manner. The process then waits for another orientation message to be received (process action 710) and repeats process actions 700 through 710.

The object selection process requires a series of correction and normalization factors to be established before it can compute the orientation of the pointer from the raw sensor values provided in an orientation message. These factors are computed in a calibration procedure. The first part of this calibration procedure involves computing correction factors for each of the outputs from the magnetometer representing the three axes of the 3-axis device, respectively. Correction factors are needed to relate the magnetometer outputs, which are a measure of deviation from the direction of the Earth's magnetic field referred to as magnetic north (specifically the dot product of the direction each axis of the magnetometer is pointed with the direction of magnetic north), to the coordinate frame established for the environment in which the pointer is operating. The coordinate frame of the environment is arbitrary, but must be pre-defined and known to the object selection process prior to performing the calibration procedure. For example, if the environment is a room in a building, the coordinate frame might be establish such that the origin is in a corner with one axis extending vertically from the corner, and the other two horizontally along the two walls forming the corner.

Figure 8:
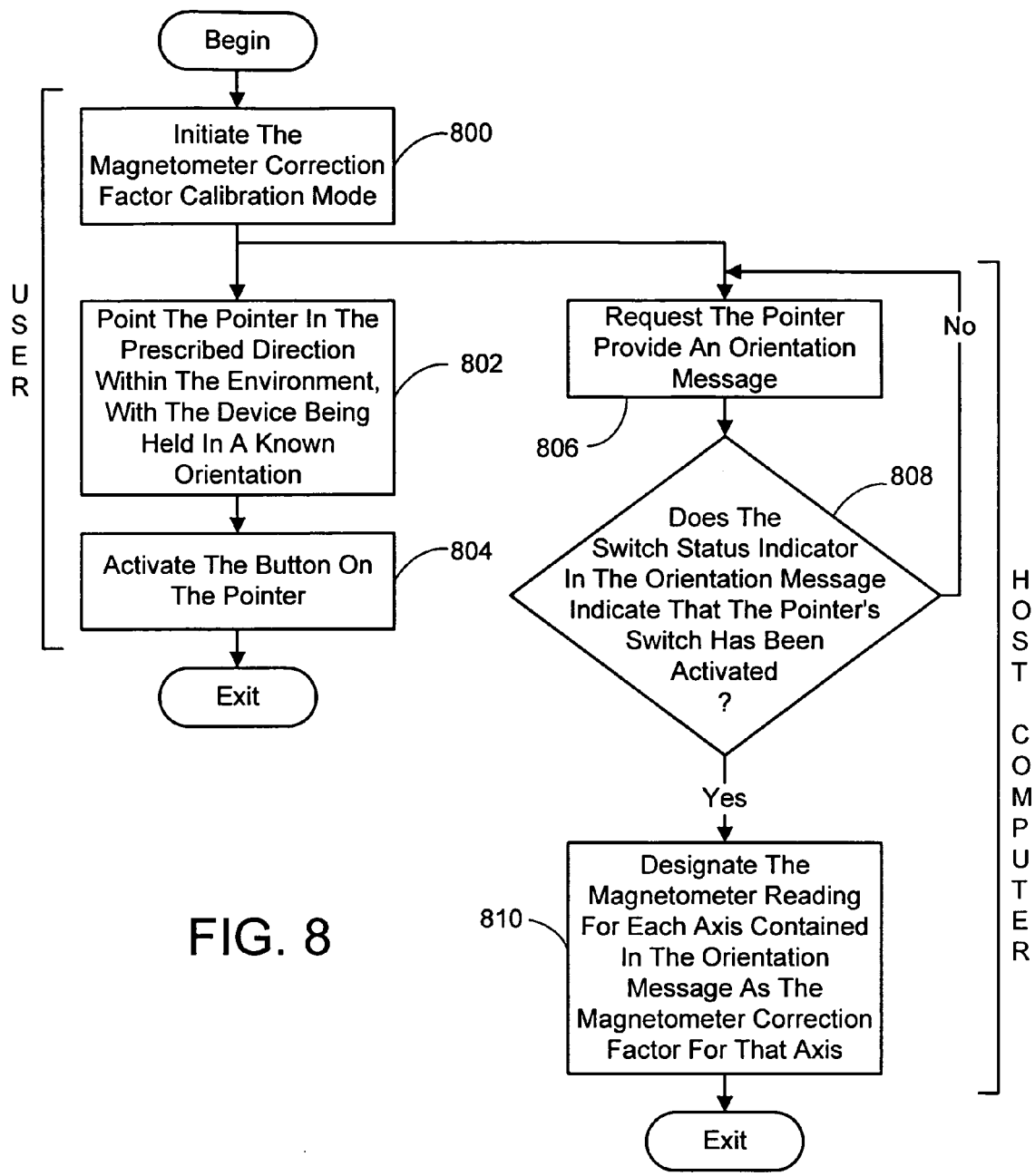
FIG. 8 is a flow chart diagramming a process for determining a set of magnetometer correction factors for use in deriving the orientation of the pointer performed as part of the overall process of FIG. 7.

Referring to FIG. 8, the magnetometer correction factors are computed by the user first indicating to the object selection process that a calibration reading is being taken, such as for instance, by the user putting the object selection process running on the host computer into a magnetometer correction factor calibration mode (process action 800). The user then points the pointer in a prescribed direction within the environment, with the device being held in a known orientation (process action 802). For example, for the sake of the user's convenience, the pre-determined direction might be toward a wall in the front of the room and the known orientation horizontal, such that a line extending from the end of the pointer intersects the front wall of the room substantially normal to its surface. If the pre-defined coordinate system of the environment is as described in the example above, then the pointer would be aligned with the axes of this coordinate system, thus simplifying the correction and normalization factor computations. The user activates the switch on the pointer when the device is pointed in the proper direction with the proper orientation (process action 804). Meanwhile, the object selection process requests the pointer provide an orientation message in the manner discussed previously (process action 806). The object selection process then inputs the orientation message transmitted by the pointer to determine if the switch status indicator indicates that the pointer's switch has been activated (process action 808). If not, the requesting and screening procedure continues (i.e., process actions 806 and 808 are repeated). However, when an orientation message is received in which the button indicator indicates the button has been depressed, then it is deemed that the sensor readings contained therein reflect those generated when the pointer is pointing in the aforementioned prescribed direction and with the prescribed orientation. The magnetometer readings contained in the orientation message reflect the deviation of each axis of the magnetometer from magnetic north within the environment and represent the factor by which each subsequent reading is offset to relate the readings to the environment's coordinate frame rather than the magnetometer axes. As such, in process action 810, the magnetometer reading for each axis is designated as the magnetometer correction factor for that axis.

Figure 9:
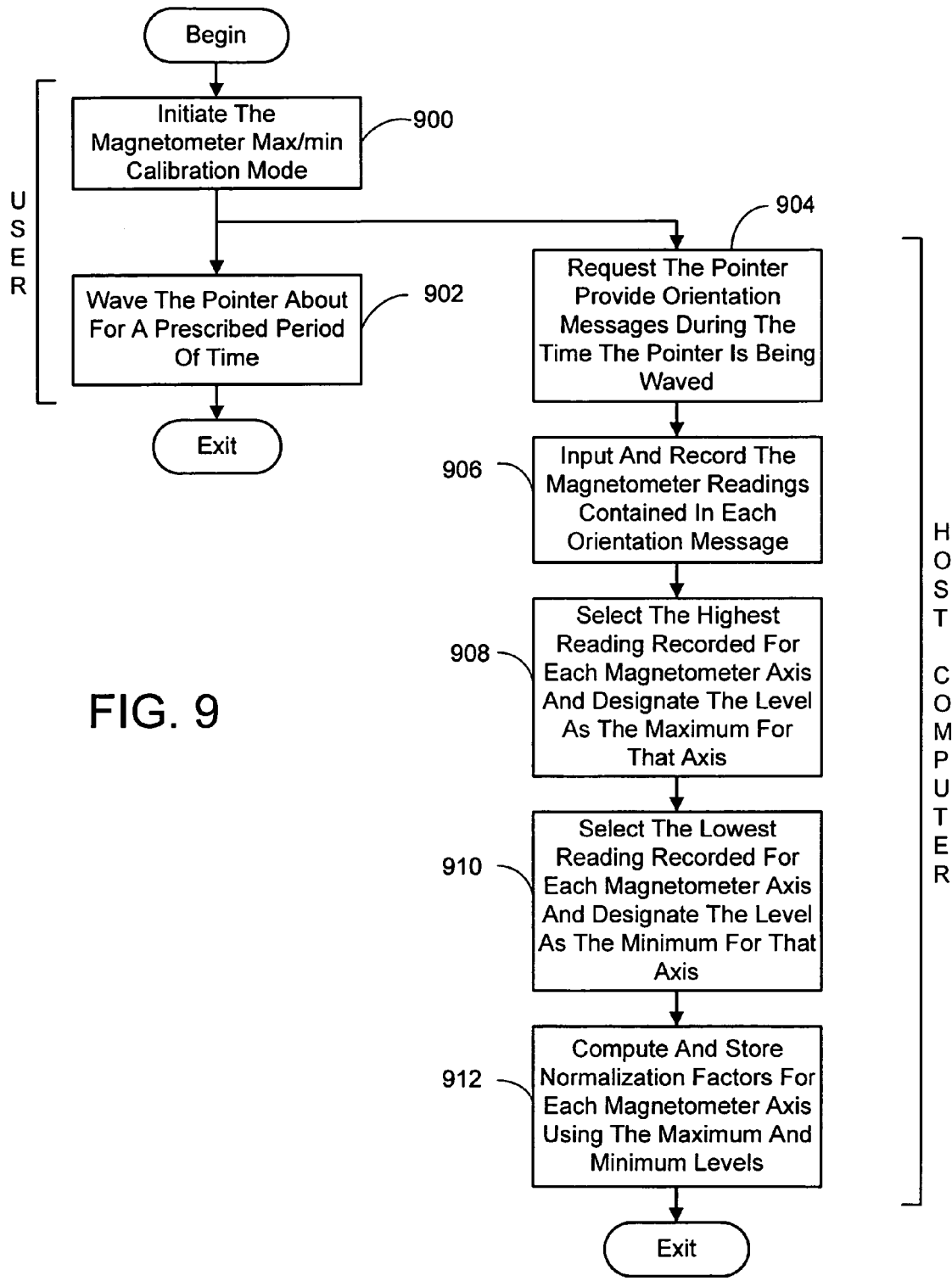
FIG. 9 is a flow chart diagramming a process for determining a set of magnetometer normalization factors for use in deriving the orientation of the pointer performed as part of the overall process of FIG. 7.

In addition to computing the aforementioned magnetometer correction factors, factors for range-normalizing the magnetometer readings are also computed in the calibration procedure. Essentially, these normalization factors are based on the maximum and minimum outputs that each axis of the magnetometer is capable of producing. These values are used later in a normalization procedure that is part of the process for determining the orientation of the pointer. A simple way of obtaining these maximum and minimum values is for the user to wave the pointer about while the outputs of the magnetometer are recorded by the host computer. Specifically, referring to FIG. 9, the user would put the object selection process running on the host computer in a magnetometer max/min calibration mode (process action 900), and then wave the pointer about (process action 902). Meanwhile, the object selection process requests the pointer to provide orientation messages in the normal manner (process action 904). The object selection process then inputs and records the magnetometer readings contained in each orientation message transmitted by the pointer (process action 906). This recording procedure (and presumably the pointer waving) continues for a prescribed period of time (e.g., about 1 minute) to ensure the likelihood that the highest and lowest possible readings for each axis are recorded. Once the recording procedure is complete, the object selection process selects the highest reading recorded for each axis of the magnetometer and designates these levels as the maximum for that axis (process action 908). Similarly, the host computer selects the lowest reading recorded for each axis of the magnetometer and designates these levels as the minimum for that axis (process action 910). Normalization factors are then computed via standard methods and stored for each magnetometer axis that convert the range represented by the maximum and minimum levels to a normalized range between 1.0 and −1.0 (process action 912). These magnetometer normalization factors are used to normalize the actual readings from the magnetometer by converting the readings to normalized values between 1.0 and −1.0 during a normalization procedure to be discussed shortly. It is noted that the maximum and minimum values for an axis physically correspond to that axis of the magnetometer being directed along magnetic north and directly away from magnetic north, respectively. It is noted that while the foregoing waving procedure is very simple in nature, it worked well in tested embodiments of the object selection system and provided accurate results.

Factors for range-normalizing (in [−1, 1]) the accelerometer readings are also computed in the calibration procedure. In this case, the normalization factors are determined using the accelerometer output normalization procedures applicable to the accelerometer used, such as the conventional static normalization procedure used in tested embodiments of the object selection process.

Figure 10A:
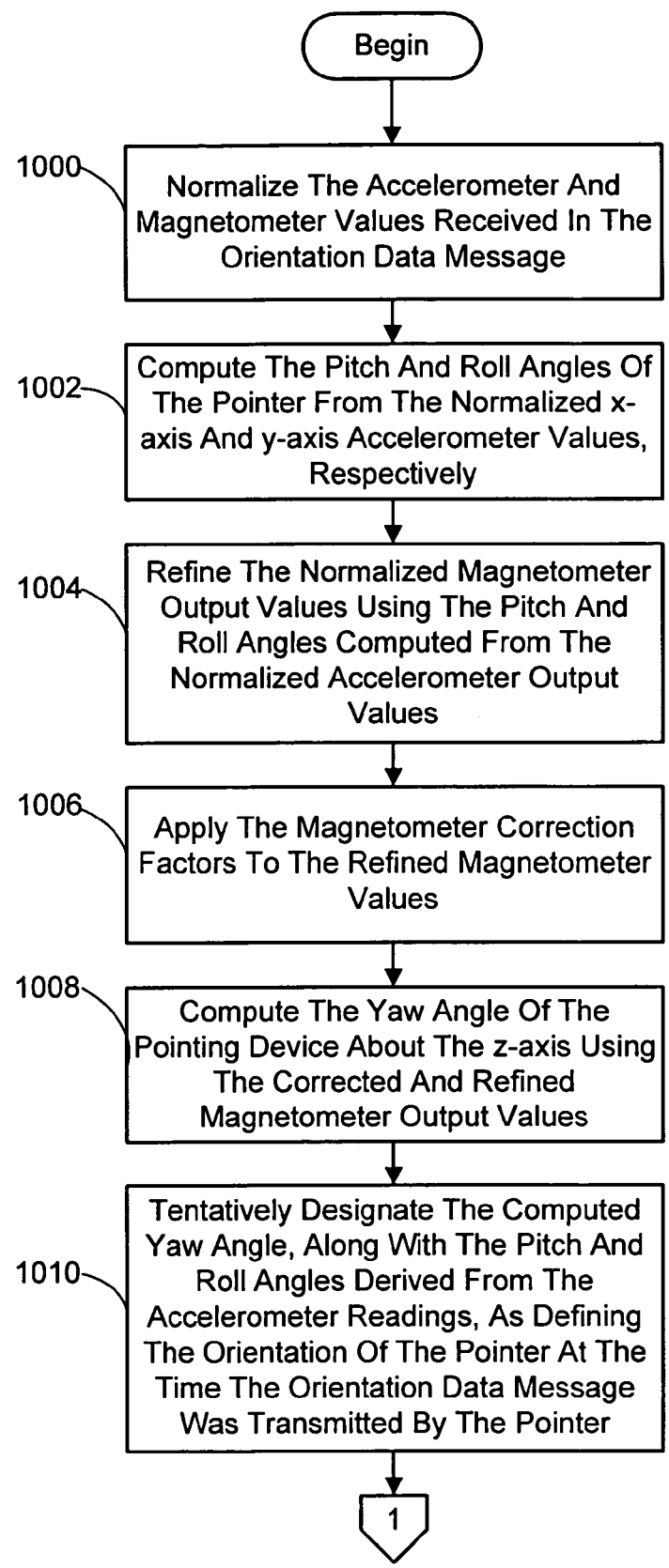
FIGS. 10A-B depict a flow chart diagramming the process for deriving the orientation of the pointer performed as part of the overall process of FIG. 7.

Once the calibration procedure is complete, the object selection process is ready to compute the orientation of the pointer each time an orientation data message is received by the host computer. The orientation of the pointer is defined in terms of its pitch, roll and yaw angle about the respective x, y and z axes of the environment's pre-defined coordinate system. These angles can be determined via various sensor fusion processing schemes that essentially compute the angle from the readings from the accelerometer and magnetometer of the pointer. Any of these existing methods could be used, however a simplified procedure was employed in tested versions of the object selection system. In this simplified procedure, the yaw angle is computed using the recorded values of the magnetometer output. Even though the magnetometer is a 3-axis device, the pitch, roll and yaw angles cannot be computed directly from the recorded magnetometer values contained in the orientation data message. The angles cannot be computed directly because the magnetometer outputs a value that is the dot-product of the direction of each magnetometer sensor axis against the direction of magnetic north. This information is not sufficient to calculate the pitch, roll, and yaw of the device. However, it is possible to use the accelerometer readings in conjunction with the magnetometer outputs to compute the orientation. Specifically, referring to FIGS. 10A and B, the first action in the procedure is to normalize the magnetometer and accelerometer values received in the orientation message using the previously computed normalization factors to simplify the calculations (process action 1000). The pitch and roll angles of the pointer are then computed from the normalized x-axis and y-axis accelerometer values, respectively (process action 1002). Specifically, the pitch angle=−arcsin($a_1$), where $a_1$ is the normalized output of the accelerometer approximately corresponding to the rotation of the pointer about the x-axis of the environment's coordinate system, and the roll angle=−arcsin($a_2$) where $a_2$ is the normalized output of the accelerometer approximately corresponding to the rotation of the pointer about the y-axis of the environment's coordinate system. Next, these pitch and roll values are used to refine the magnetometer readings (process action 1004). Then, in process action 1006, the previously computed magnetometer correction factors are applied to the refined magnetometer values. Finally, the yaw angle is computed from the refined and corrected magnetometer values (process action 1008).

Specifically, the range-normalized accelerometer values representing the pitch and roll are used to establish the rotation matrix $R_{a1,a2,0}$, which represents a particular instance of the Euler angle rotation matrix $R_{\theta_x,\theta_y,\theta_z}$ that defines the composition of rotations about the x, y and z axes of the prescribed environmental coordinate system. Next, a 3-value vector m is formed from the range-normalized values output by the magnetometer. The pitch and roll then corrects the output of the magnetometer as follows:

$$m_{corected} = R_{a1,a2_y,0} m \quad (1)$$

Let N be the output of the magnetometer when the pointer is held at (pitch, roll, yaw)=(0, 0, 0), as determined in the calibration procedure. Then, project onto the ground plane and normalize as follows:

$$m_{projected} = [1 \ 1 \ 0]^T m, \ N_{projected} = [1 \ 1 \ 0]^T N \quad (2)$$

$$m_{normalized \ \& \ projected} = \frac{m_{projected}}{\|m_{projected}\|},$$

$$N_{normalized \ \& \ projected} = \frac{N_{projected}}{\|N_{projected}\|}$$

And finally, the yaw angle is found as follows:

$$yaw = sign(m_{np} \times N_{np}) \cos^{-1}(m_{np}^T N_{np}) \quad (3)$$

The computed yaw angle, along with the pitch and roll angles derived from the accelerometer readings, are then tentatively designated as defining the orientation of the pointer at the time the orientation data message was transmitted by the device (process action 1010).

It is noted that there are a number of caveats to the foregoing procedure. First, accelerometers only give true pitch and roll information when the pointer is motionless. This is typically not an issue except when the orientation computations are being used to determine if the pointer is being pointed directly at an object. In such cases, the problem can be avoided by relying on the orientation information only when the device is deemed to have been motionless when the accelerometer readings were captured. To this end, the orientation (i.e., pitch, roll and yaw) of the pointer is computed via the foregoing procedure for the last orientation message received. This is then compared to the orientation computed for the next to last orientation message received, to determine if the orientation of the pointer has changed significantly between the orientation messages. If the orientation of the pointer did not change significantly, then this indicates that the pointer was motionless prior to the transmission of the last orientation message. If the pointer was deemed to have been motionless, then the orientation information is used. However, if it is found that a significant change in the orientation occurred between the last two orientation messages received, it is deemed that the pointer was in motion and the orientation information computed from the last-received orientation message is ignored. Secondly, magnetic north can be distorted unpredictably in indoor environments and in close proximity to large metal objects. However, in practice, while it was found that for typical indoor office environments magnetic north did not always agree with magnetic north found outdoors, it was found to be fairly consistent throughout a single room. Thus, since the above-described magnetometer correction factors relate the perceived direction of magnetic north in the environment in which the pointer is operating to the prescribed coordinate system of that environment, when the environment is a room, it will not make any difference if the perceived direction of magnetic north within the room matches that in any other room or outdoors, as the orientation of the pointer is computed for that room only. Finally, it should be noted that the foregoing computations will not provide accurate results if the perceived magnetic north in the environment happens to be co-linear to the gravity vector—a situation not likely to occur.

Figure 10B:
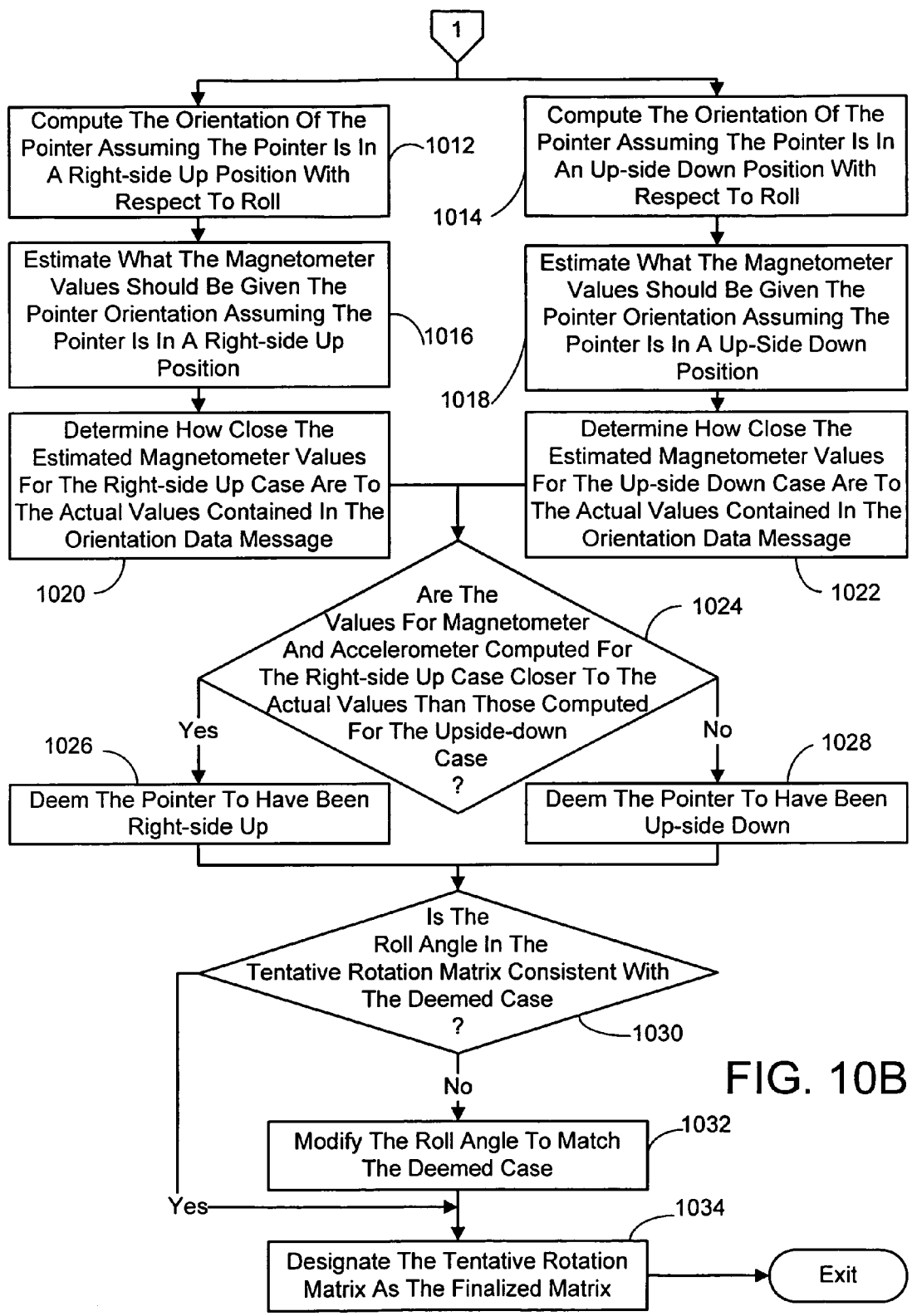

The foregoing designation of the pointer's orientation is tentative because it cannot be determined from the accelerometer reading used to compute the roll angle whether the device was in a right-side up, or upside-down position with respect to roll when the accelerometer outputs were captured for the orientation data message. Thus, the computed roll angle could be inaccurate as the computations assumed the pointer was right-side up. Referring now to FIG. 10B, this uncertainty can be resolved by computing the orientation assuming the pointer is right-side up (process action 1012) and then assuming the pointer is up-side down (process action 1014). Each solution is then used to compute an estimate of what the magnetometer outputs should be given the computed orientation (process actions 1016 and 1018). It is then determined for each case how close the estimated magnetometer values are to the actual values contained in the orientation message (process actions 1020 and 1022). It is next ascertained whether the estimated magnetometer values for the right-side up case are closer to the actual values than the estimated value for the upside-down case (process action 1024). If they are, then the pointer is deemed to have been right-side up (process action 1026). If, however, it is determined that the estimated magnetometer values for the right-side up case are not closer to the actual values than the estimated value for the upside-down case, then the pointer is deemed to have been up-side down (process action 1028). It is next determined if roll angle computed in the tentative rotation matrix is consistent with the deemed case (process action 1030). If it is consistent, the tentative rotation matrix is designated as the finalized rotation matrix (process action 1034). If, however, the tentative rotation matrix is inconsistent with the minimum error case, then the roll angle is modified (i.e., by 180 degrees) in process action 1032, and the modified rotation matrix is designated as the finalized rotation matrix (process action 1034).

One way to accomplish the foregoing task is to compute the orientation (R) as described above, except that it is computed first assuming the pitch angle derived from the accelerometer output reflects a right-side up orientation of the pointer, i.e., $Pitch_{right-side \ up} = -\arcsin(a)$ where a is the normalized output of the accelerometer approximately corresponding to the rotation of the pointer about the x-axis of the environment's coordinate system. The orientation is then computed assuming the pitch angle derived from the accelerometer output reflects an up-side down orientation of the pointer, i.e., $Pitch_{up-side \ down} = -\pi + \arcsin(a)$. A separate estimate of what the magnetometer outputs (m*) should be given the orientation computed for the right-side up condition and for the up-side down condition are then computed as follows:

$$m^* = R^T N, \quad (4)$$

where N is the direction of magnetic north. m* is the estimated magnetometer output assuming the pointer is in the right-side up condition when R is the orientation computed assuming the pointer was in this condition, whereas m* is the estimated magnetometer output assuming the pointer is in the up-side down condition when R is the orientation computed assuming the pointer was in that condition. The error between the estimated magnetometer outputs (m*) and the actual magnetometer outputs (m) is next computed for both conditions, where the error is defined as $(m^*-m)^T(m^*-m)$. The pointer orientation associated with the lesser of the two error values computed is deemed to be the actual orientation of the pointer. It is noted that the roll angle derived from the accelerometer output could be used to perform as similar error analysis and determine the actual orientation of the pointer.

It is further noted that the 2-axis accelerometer used in the tested versions of the pointer could be replaced with a more complex 3-axis accelerometer, or an additional 1-axis accelerometer or mercury switch oriented in the appropriate direction could be employed, to eliminate the need for the foregoing error computation procedure. This would be possible because it can be determined directly from the "third"-axis readout whether the pointer was right-side up or upside-down with respect to roll. However, this change would add to the complexity of the pointer and must be weighed against the relatively minimal cost of the added processing required to do the error computation procedure.

Figure 11:
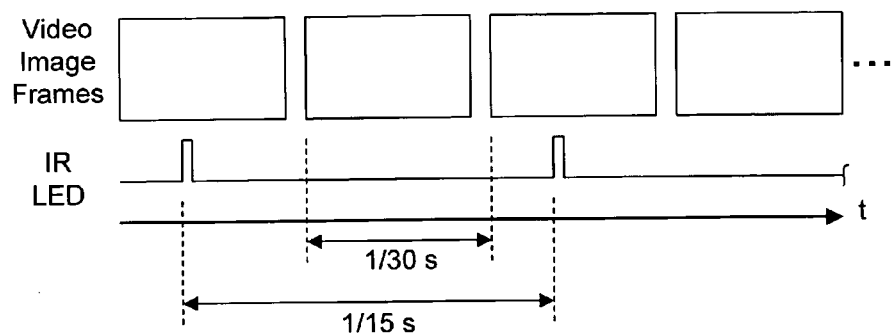
FIG. 11 is a timeline depicting the relative frequency of the production of video image frames by the video cameras of the system of FIG. 1 and the short duration flash of the IR LED of the pointer.
Figures 12A, 12B:
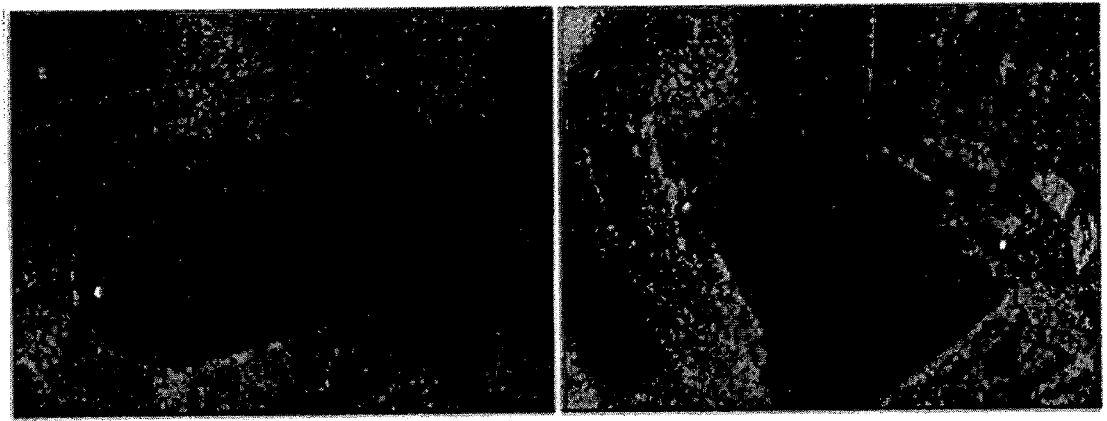
FIGS. 12A-B are images respectively depicting an office at IR frequencies from each of two IF pass-filtered video cameras, which capture the flash of the IR LED of the pointer.
Figures 12C, 12D:
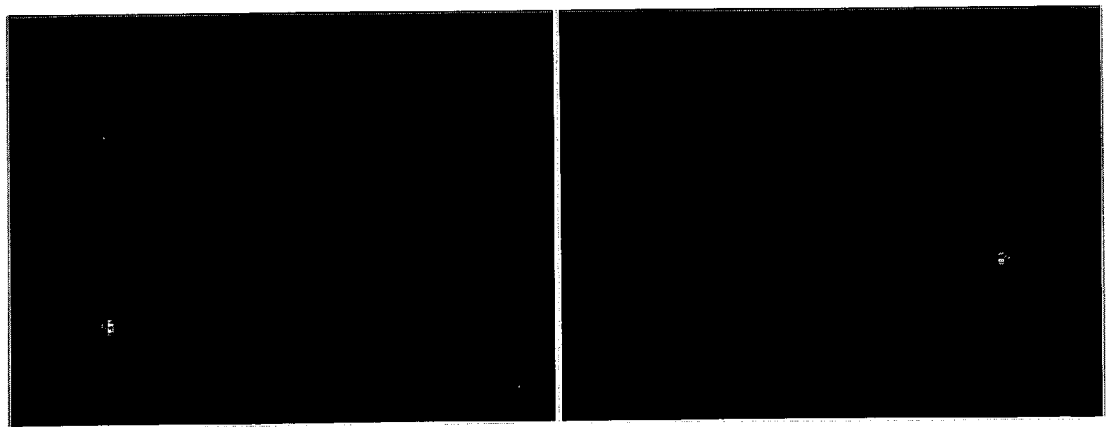
FIGS. 12C-D are difference images of the same office as depicted in FIGS. 12A-B where
Figure 13:
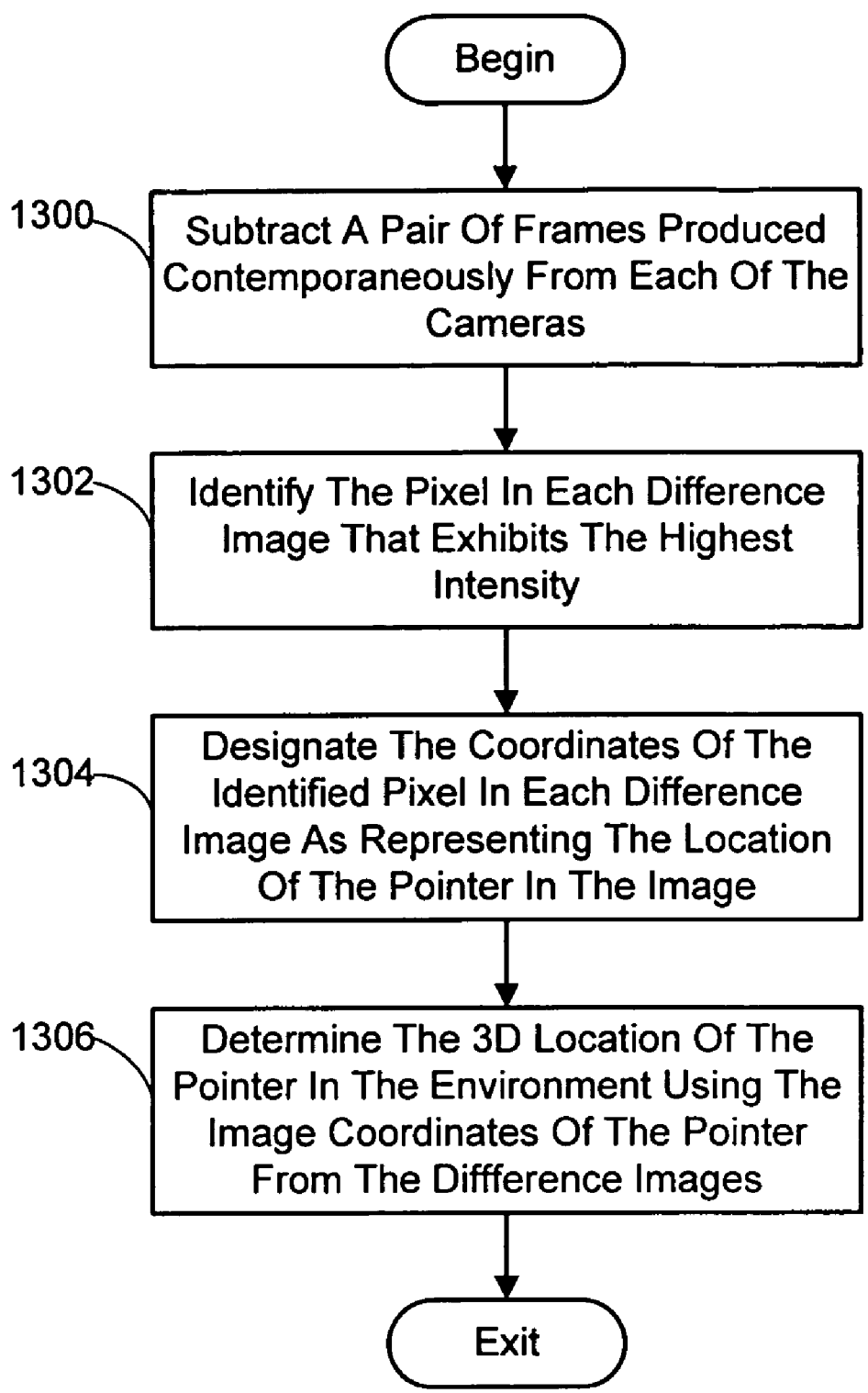
FIG. 13 depicts a flow chart diagramming the process for determining the location of the pointer performed as part of the overall process of FIG. 7.

As indicated previously, both the orientation and location of the pointer within the environment in which it is operating are needed to determine where the user is pointing the device. The position of the pointer within the environment can be determined via various methods, such as using conventional computer vision techniques [1] or ultrasonic acoustic locating systems [2, 3]. While these methods, and their like, could be used successfully, they are relatively complex and often require an expensive infrastructure to implement. A simpler, less costly process was developed for tested versions of the system and will now be described. Specifically, the position of the pointer within the environment is determined with the aid of the two video camera having IR-pass filters. The cameras are calibrated ahead of time to the environment's coordinate system using conventional calibration methods to establish the camera parameters (both intrinsic and extrinsic) that will be needed to determine the 3D position of the pointing end of the pointer from images captured by the cameras. In operation, the aforementioned IR LED of the pointer is flashed for approximately 3 milliseconds at a rate of approximately 15 Hz by the device's microcontroller. Simultaneously, both cameras are recording the scene at 30 Hz. This means that the IR light in the environment is captured in $\frac{1}{30}^{th}$ of a second exposures to produce each frame of the video sequence produced each camera. Referring to the time line depicted in FIG. 11, it can be seen that the flash of the IR LED will be captured in every other frame of the video sequence produced by each camera due to the approximately 15 Hz flashing rate. Referring now to FIGS. 12A and B, images depicting the scene at IR frequencies and capturing the flash from the pointer are shown, as produced contemporaneously from each camera. As can be seen, the IR LED flash appears as a bright spot against a background lower intensity IR noise. Referring now to FIG. 13, the procedure for ascertaining the location to the pointer in terms of the pre-defined coordinate system of the environment will be described. First, the image coordinates of the IR LED flash are determined in each contemporaneously captured frame from the cameras that depicts the flash. This is accomplished by first performing a standard subtraction process on a contemporaneously produced pair of frames from each of the cameras (process action 1300). The resulting difference images represent the scene with most of the background IR eliminated and the IR LED flash the predominant feature in terms of intensity in the images, as shown in FIGS. 12C and D which depict the scene from the cameras captured in the image of FIGS. 12A & B respectively once the background IR is eliminated via the subtraction method. A standard peak detection procedure is then performed on the difference image computed from each pair of frames produced by each of the cameras (process action 1302). This peak detection procedure identifies the pixel in the difference image exhibiting the highest intensity. The image coordinates of this pixel are deemed to represent the location of the pointer in the image (process action 1304). Once the image coordinates of the pointer (as represented by the IF LED) are computed from a pair of images produced contemporaneously by each camera, standard stereo image techniques (typically involving triangulation) are employed to determine the 3D location of the pointer in the environment (process action 1306).

Once the pointer's location and orientation at a given point in time are known it is possible to determine where the user is pointing in anticipation of affecting an object in the vicinity. There are numerous methods that can be used to determine the pointed-to location and to identify the object at or near that location. In tested versions of the system, a Gaussian blob scheme is employed to accomplish the foregoing task. This entails first modeling all the objects in the environment that it is desired for the user to be able to affect by pointing at it with the pointer, as 3D Gaussian blobs. In other words, the location and extent of the object is modeled as a single 3D Gaussian blob defined by the coordinates of a 3D location in the environment representing the mean $\mu$ of the blob and a covariance $\Sigma$ defining the outside edge of the blob. These multivariate Gaussians are probability distributions that are easily learned from data, and can coarsely represent an object of a given size and orientation.

Figure 14:
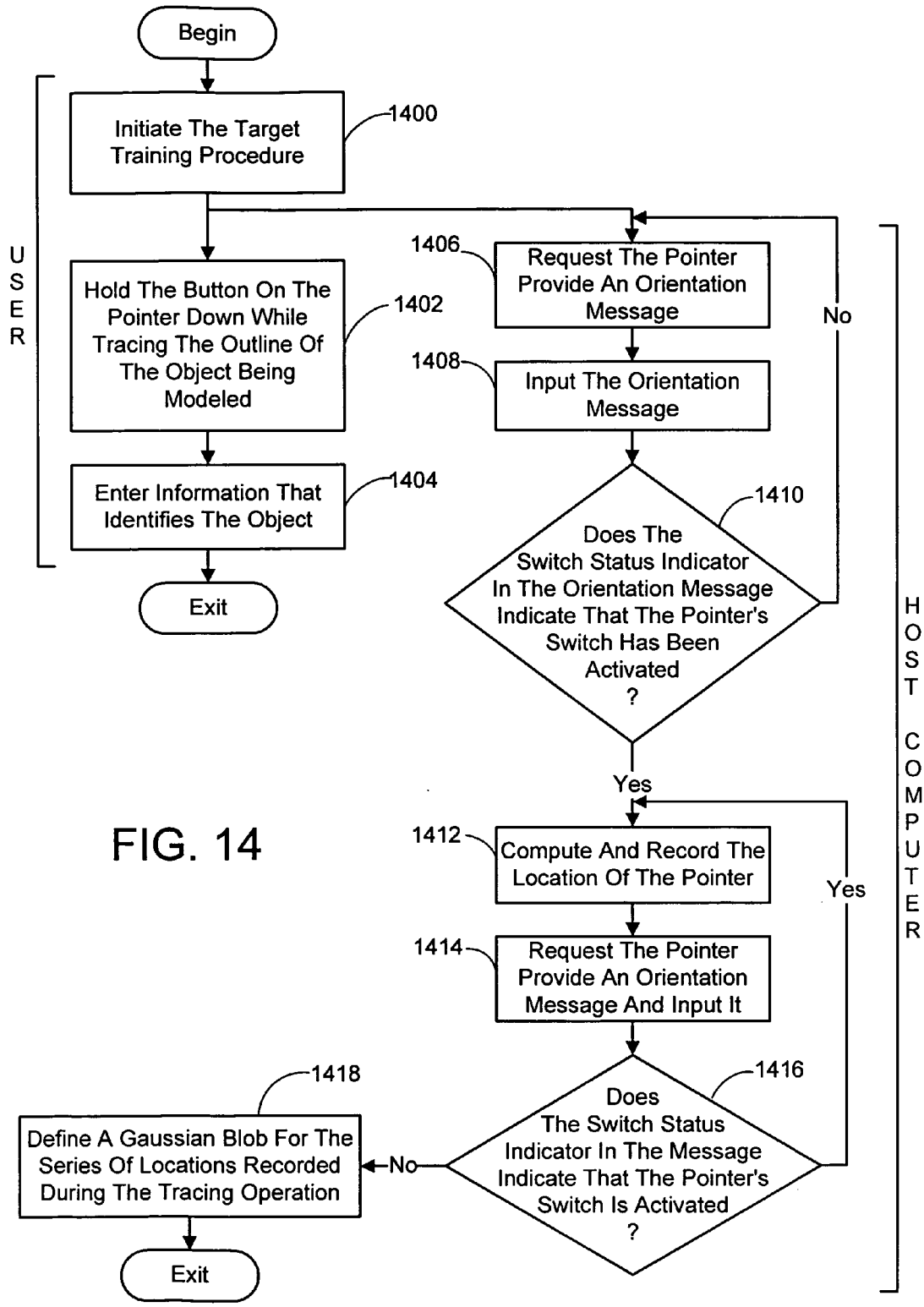
FIG. 14 is a flow chart diagramming a first process for using the object selection system of FIG. 1 to model an object in an environment, such as a room, as a Gaussian blob.

The modeling of the objects of interest in the environment as Gaussian blobs can be accomplished in any conventional manner. In tested versions of the object selection system, two different methods were employed. Referring to FIG. 14, the first involves the user initiating a target training procedure that is part of the object selection process (process action 1400), and then holding the button on the pointer down as he or she traces the outline of the object (process action 1402). In addition, the user enters information into the process that identifies the object being traced (process action 1404). Meanwhile, the target training procedure causes a request to be sent to the pointer directing it to provide an orientation message in the manner described previously (process action 1406). The orientation message transmitted by the pointer is inputted (process action 1408), and it is determined whether the button state indicator included in the message indicates that the pointer's button is activated (process action 1410). If not, process actions 1406 through 1410 are repeated. When, it is discovered that the button state indicator indicates the button is activated, then in process action 1412, the location of the pointer (as represented by the IR LED) is computed and recorded in the manner described above using the output from the video cameras. Next, a request is sent to the pointer directing it to provide an orientation message, and it is input when received (process action 1414). It is then determined whether the button state indicator still indicates that the pointer's button is activated (process action 1416). If so, process actions 1412 through 1416 are repeated. If, however, it is discovered that the button state indicator indicates the button is no longer activated, then it is deemed that the user has completed the tracing task and in process action 1418, a Gaussian blob is defined for the series of locations recorded during the tracing. Specifically, for recorded locations $x_i$, the mean and covariance of the these points is computed as follows:

$$\mu = \frac{1}{n}\sum_i x_i \qquad (5)$$

$$\Sigma = \frac{1}{n}\sum_i (x_i - \mu)(x_i - \mu)^T$$

The computed mean and covariance define the Gaussian blob representing the traced object. This procedure can then be repeated for each object of interest in the environment.

An alternate, albeit somewhat more complex, method to model the objects of interest in the environment as Gaussian blobs was also employed in tested versions of the object selection process. This method has particular advantage when an object of interest is out of the line of sight of one or both of the cameras, such as if it were located near a wall below one of the cameras. Since images of the object from both cameras are needed to compute the pointers location, and so the points $x_i$ in the tracing procedure, the previously described target training method cannot be used unless both of the cameras can "see" the object.

Figure 15:
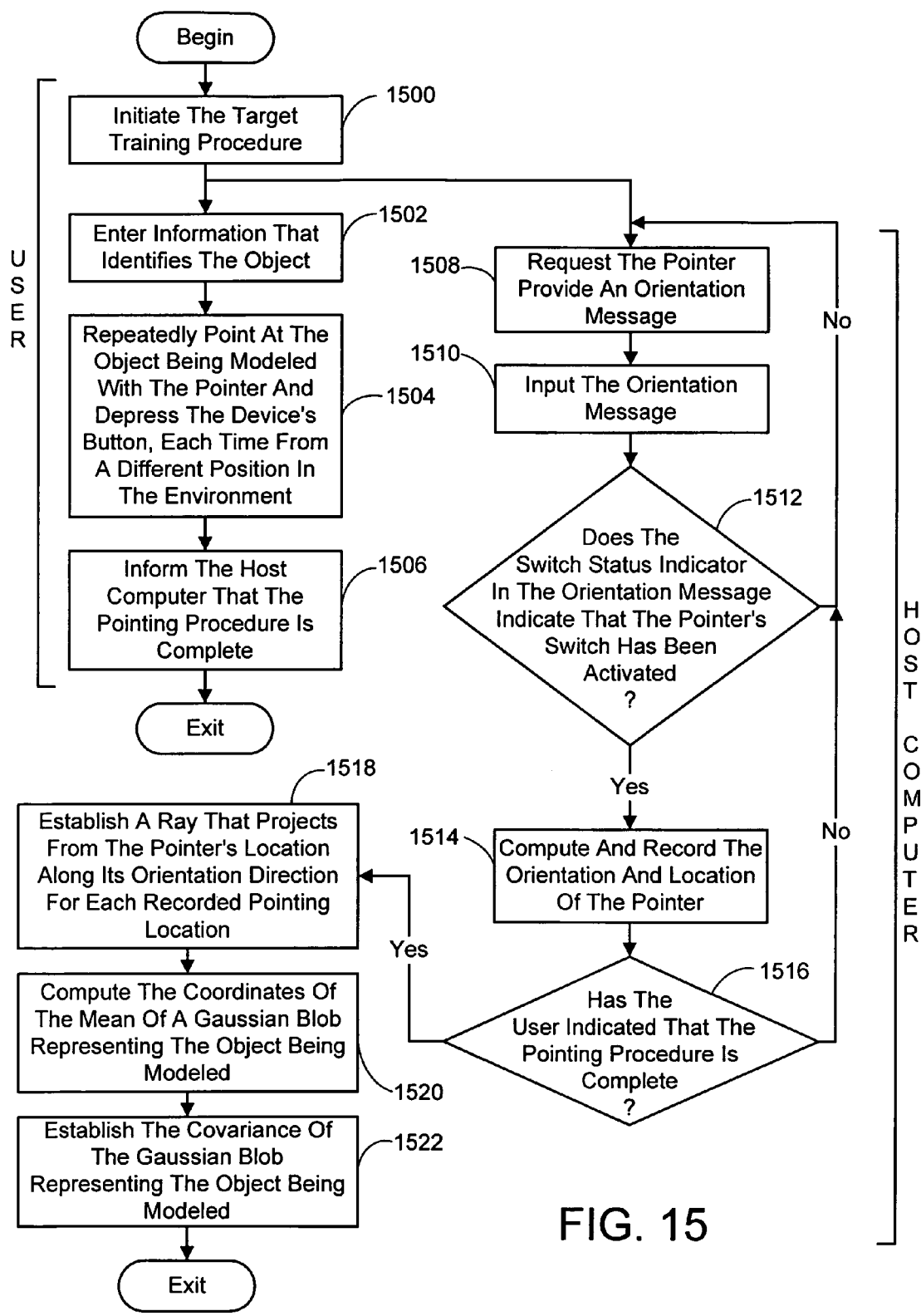
FIG. 15 is a flow chart diagramming an alternate process for using the object selection system of FIG. 1 to model an object in an environment as a Gaussian blob.

Referring to FIG. 15, this second target training method involves the user first initiating the training procedure (process action 1500), and then entering information identifying the object to be modeled (process action 1502). The user then repeatedly (i.e., at least twice) points at the object being modeled with the pointer and depresses the device's button, each time from a different position in the environment within the line of sight of both cameras (process action 1504). When the user completes the foregoing action at the last pointing location, he or she informs the host computer that the pointing procedure is complete (process action 1506). Meanwhile, the training procedure causes a request to be sent to the pointer directing it to provide an orientation message in the manner described previously (process action 1508). The orientation message transmitted by the pointer is inputted (process action 1510), and it is determined whether the button state indicator included in the message indicates that the pointer's button is activated (process action 1512). If not, process actions 1508 through 1512 are repeated. When, it is discovered that the button state indicator indicates the button is activated, then in process action 1514, the orientation and location of the pointer are computed and recorded using the procedures described previously. It is next determined if the user has indicated that the pointing procedure is complete (process action 1516). If not, process actions 1508 through 1516 are then repeated as appropriate. If, however, the pointing procedure is complete, a ray that projects through the environment from the pointer's location along the device's orientation direction is established for each recorded pointing location (process action 1518). Next, the coordinates of the point in the environment representing the mean of a Gaussian blob that is to be used to model the object under consideration, are computed (process action 1520). This is preferably accomplished as follows. For each pointing location:

$$x_i + s_i w_i = \mu \qquad (6)$$

where $x_i$ is the position of the pointer at the $i^{th}$ pointing location, $w_i$ is the ray extending in the direction the pointer is pointed from the $i^{th}$ pointing location, and $s_i$ is an unknown distance to the target object. This defines a linear system of equations that can be solved via a conventional least squares procedure to find the mean location that best fits the data.

The covariance of the Gaussian blob representing the object being modeled is then established (process action 1522). This can be done in a number of ways. First, the covariance could be prescribed or user entered. However, in tested versions of the target training procedure, the covariance of the target object was computed by adding a minimum covariance to the spread of the intersection points, as follows:

$$\Sigma = \Sigma_0 + (x_i + s_i w_i - \mu)(x_i + s_i w_i - \mu)^T \qquad (7)$$

It is noted that the aforementioned computations do not take into account that the accuracy in pointing with the pointer is related to the angular error in the calculation of the device's orientation (and so in the ray $w_i$). Thus, a computed pointing location that is far away from the object being modeled is inherently more uncertain than a computed pointing location which is nearby the target. Accordingly, the foregoing target training procedure can be refined by discounting the more remote pointing location to some degree in defining the Gaussian blob representing an object being modeled. This can be accomplished using a weighted least squares approach, as follows:

$$W_i(x_i + s_i w_i) = W_i \mu \qquad (8)$$

$$W_i = \left(\frac{1}{c\hat{s}_i + \eta}\right)^2 I$$

where $W_i$ is the weight assigned to the $i^{th}$ pointing location, $\hat{s}_i$ is an estimate of the distance to the target object, possibly computed using the previous procedure employing the non-weighted least squares approach, c and $\eta$ are parameters related to the angular error of the pointer, and I is the identity matrix. As before, Eq. (8) is generated for each pointing location to define a linear system of equations that can be solved via the least squares procedure to find the mean location that best fits the data, but this time taking into consideration the angular error associated with the computed orientation of the pointer.

It is noted that the foregoing procedures for computing the mean and covariance of a Gaussian blob representing an object allow the represented shape of the object to be modified by simply adding any number of pointing locations where the pointer is pointed along the body of the target object.

Once a Gaussian blob for each object of interest in the environment has been defined, and stored in the memory of the host computer, the pointer can be used to select an object by simply pointing at it. The user can then affect the object, as mentioned previously. However, first, the processes that allow a user to select a modeled object in the environment using the pointer will be described. These processes are preformed each time the host computer receives an orientation message from the pointer.

One simple technique for selecting a modeled object is to evaluate the Gaussian distribution at a point nearest the mean of each Gaussian representing an object of interest in the environment which is intersected by the a ray cast by the pointer, along that ray. The likelihood that the pointer is being pointed a modeled object i is then:

$$l_i = g(x + \|\mu_i - x\|w, \Sigma_i) \qquad (9)$$

where x is the position of the pointer (as represented by the IR LED), w is a ray extending from x in the direction the pointer is pointed, and g(μ,Σ) is the probability distribution function of the multivariate Gaussian. The object associated with the Gaussian blob exhibiting the highest probability l can then be designated as the selected object.

Figure 16:
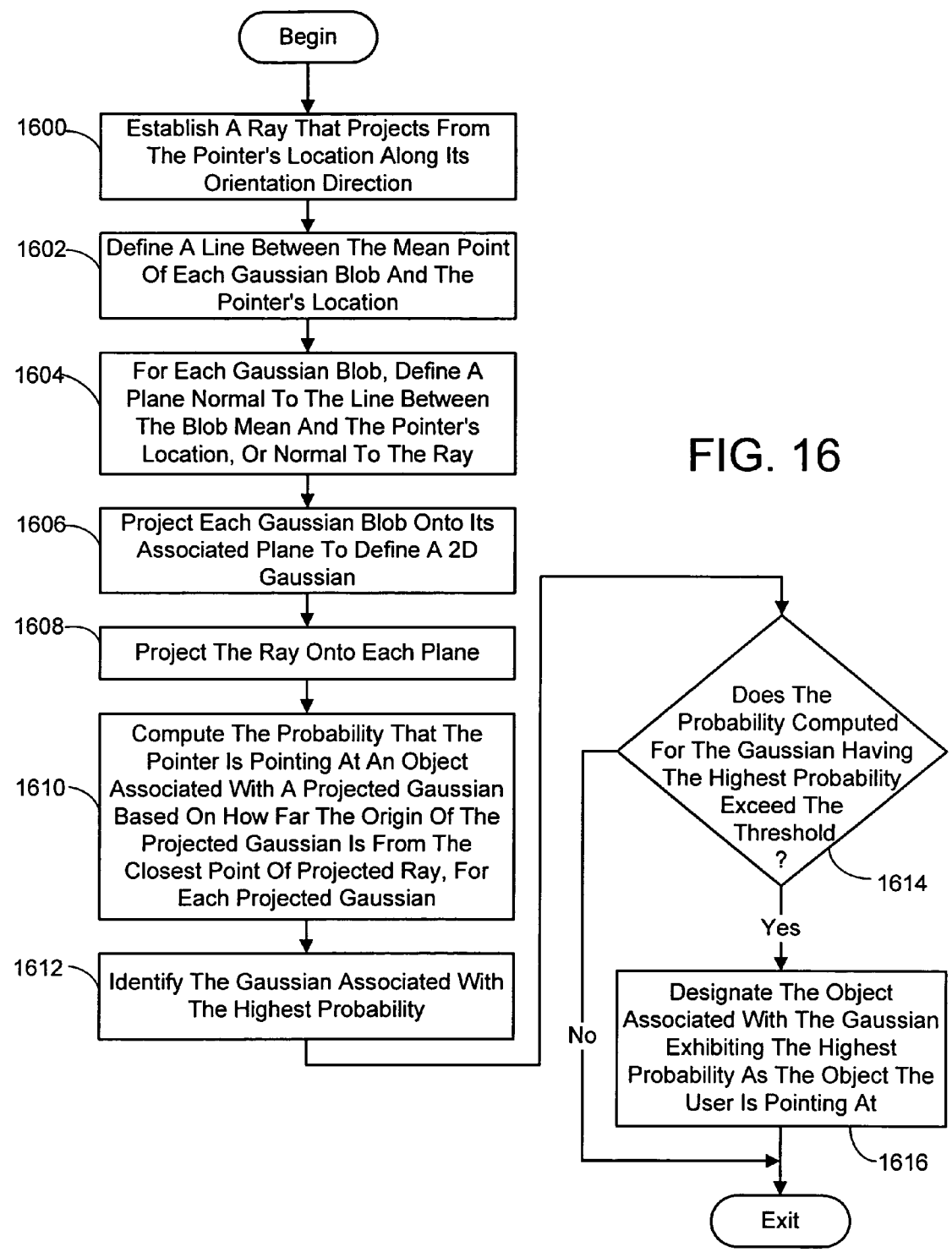
FIG. 16 depicts a flow chart diagramming a process for determining what object a user is pointing at with the pointer as part of the overall process of FIG. 7.

Another approach is to project each Gaussian onto a plane normal to either w or μ–x, and then to take the value of the resulting 2D Gaussian at the point where the ray w intersects the plane. This approach can be accomplished as follows. Referring to FIG. 16, the ray that projects through the environment from the pointer's location along the device's orientation direction, is established (process action 1600). In addition, a line is defined between the mean point of each of the Gaussian blobs and the pointer's location (process action 1602). Next, for each Gaussian blob a plane normal to the line between the blob mean and the pointer's location, or alternately a plane normal to the ray, is then defined (process action 1604). Each Gaussian blob is then projected onto the associated plane using standard methods, to define a 2D Gaussian (process action 1606). The aforementioned ray is also projected onto each of these planes (process action 1608). This projection may be a point if the ray is normal to the plane or a line if it is not normal to the plane. For each projected Gaussian, the likelihood that the pointer is being pointed at the associated object is computed based on how far the origin of the projected Gaussian is from the closest point of projected ray using standard methods (process action 1610). Essentially, the shorter the distance between the origin of the projected Gaussian and the closest point of projected ray, the higher the probability that the pointer is being pointed at the object associated with the Gaussian. Thus, in process action 1712, the Gaussian blob having the highest probability is identified. At this point the Gaussian blob associated with the highest probability could be designated as the selected object. However, this could result in the nearest object to the direction the user is pointing being selected, even though the user may not actually be intending to select it. To prevent this situation, a thresholding procedure can be performed. Referring to FIG. 16 once again, this thresholding procedure involves determining if the probability computed for the Gaussian blob identified as having the highest probability exceeds a prescribed threshold (process action 1614). If the computed probability exceeds the threshold, then the object associated with the Gaussian blob exhibiting the highest probability is designated as being the object the user is pointing at (process action 1616). The threshold will vary depending on the environment, but generally should be high enough to ensure an object is actually being pointed at and that the user is not just pointing at no particular object. In this way, the process does not just pick the nearest object. Thus, if it is determined the computed probability the Gaussian blob identified as having the highest probability does not exceed the prescribed threshold, then no object is selected and the procedure ends. The foregoing procedure is then repeated upon receipt of the next orientation message, as indicated previously. It is noted that the thresholding procedure can also be applied to the first technique for selecting a modeled object, if desired.

It is further noted that the calculation associated with the weighted least squares approach described above can be adopted to estimate the average angular error of the pointer without reference to any ground truth data. This could be useful for correcting the computed pointer orientation direction. If this were the case, then the simpler non-weighted least squares approach could be employed in the alternate target object training procedure, as well as making the object selection process more accurate. The average angular error estimation procedure requires that the pointer be modified by the addition of a laser pointer, which is attached so as to project a laser beam along the pointing direction of the pointer. The user points at the object with the pointer from a position in the environment within the line of sight of both cameras, and depresses the device's button, as was done in the alternate target object training procedure. In this case, this pointing procedure is repeated multiple times at different pointing locations with the user being careful to line up the laser on the same spot on the surface of the target object. This eliminates any error due to the user's pointing accuracy. The orientation and location of the pointer at each pointing location is computed using the procedures described previously. The average angular error is then computed as follows:

$$\sum_i \frac{1}{n} \left| \cos^{-1}\left( w^T \frac{\mu - x_i}{\|\mu - x_i\|} \right) \right| \qquad (10)$$

wherein i refers to the pointing location in the environment, n refers to the total number of pointing locations, w is a ray originating at the location of the pointing device and extending in a direction defined by the orientation of the device, x is the location of the pointing device, and μ is the location of the mean of the Gaussian blob representing the target object Without reference to ground truth position data, this estimate of error is a measure of the internal accuracy and repeatability of the pointer pointing and target object training procedures. This measure is believed to be more related to the overall performance of the pointer than to an estimate of the error in absolute position and orientation of the device, which is subject to, for instance, the calibration of the cameras to the environment's coordinate frame.

2.0 GESTURE RECOGNITION

As described above, the orientation and position of the pointer may be found by a combination of sensors and signal processing techniques. This allows an object, which is an electronic component controllable by a computer via a network connection or an extension thereof, to be selected based on a geometric model of the environment containing the object. The selection of a target object is accomplished by a user merely pointing at the object with the pointer for a moment.

Once the object is selected, the electronic device can be controlled by the user informing the computer in some manner of what he or she wants the device to do. As described above, this may be as simple as instructing the computer to turn the device on or off by activating a switch or button on the pointer. However, it is also desirable to control device in more complex ways than merely turning them on or off. Thus, the user must have some way of relaying the desired command to the computer. One such way is by having the user perform certain gestures with the pointer that the computer will recognize as particular commands. This can be accomplished in a variety of ways.

Figure 17:
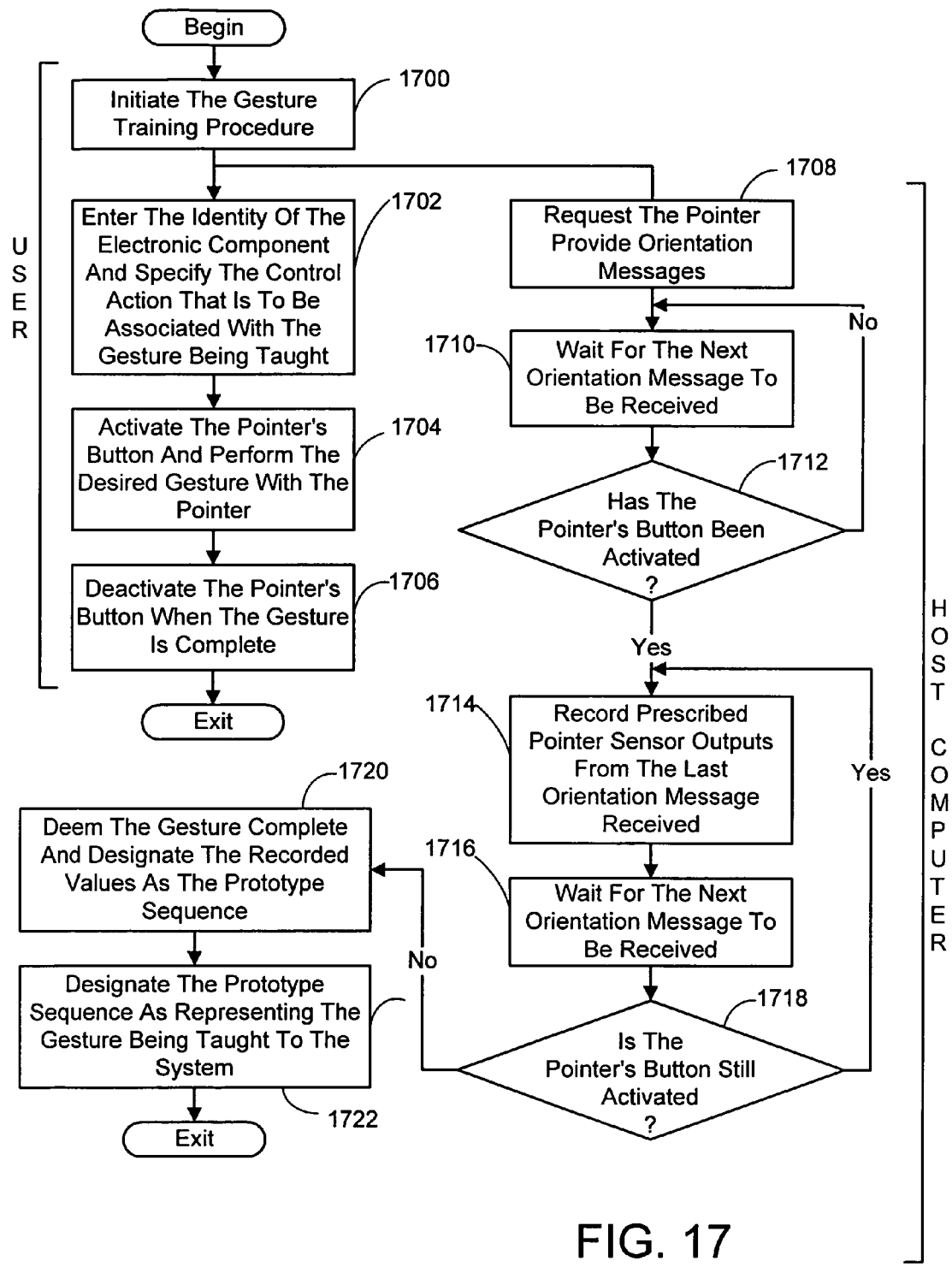
FIG. 17 is a flow chart diagramming a process for teaching the system of FIG. 1 to recognize gestures performed with the pointer that represent control actions for affecting an electronic component corresponding to or associated with a selected object.

One approach involves matching a sequence of sensor values output by the pointer and recorded over a period of time, to stored prototype sequences each representing the output of one or more sensors that would be expected if the pointer were manipulated in a prescribed manner. This prescribed manner is the aforementioned gesture. The stored prototype sequences are generated in a training phase for each electronic component it is desired to control via gesturing. To account for the fact that a gesture made by a user during runtime may differ from the gesture performed to create the prototype sequence in terms of speed and amplitude, the aforementioned matching process can not only entail comparing a prototype sequence to the recorded sensor values but also comparing the recorded sensor values to various versions of the prototype that are scaled up and down in amplitude and/or warped in time (i.e., linearly stretched and contracted). The procedure used to generate each prototype sequence associated with a particular gesture is outlined in the flow diagram shown in FIG. 17. Specifically, the user initiates a gesture training mode of the electronic component control process running on the aforementioned host computer (process action 1700). The user then inputs the identity of the electronic component that is capable of being controlled by the host computer and specifies the particular control action that is to be associated with the gesture being taught to the control system (process action 1702). Next, the user activates the aforementioned button on the pointer and performs a unique gesture with the pointer, which the user desires to represent the previously specified control action for the identified component (process action 1704). Finally, the user deactivates (e.g., releases) the pointer's button when the gesture is complete (process action 1706). Meanwhile, the gesture training process causes periodic requests to be sent to the pointer directing it to provide orientation messages in the manner described previously (process action 1708). The process waits for an orientation message to be received (process action 1710), and upon receipt determines whether the switch state indicator included in the message indicates that the pointer's button is activated (process action 1712). If not, process actions 1710 and 1712 are repeated. When, it is discovered that the button state indicator indicates the button is activated, then in process action 1714, a portion of a prototype sequence is obtained by recording prescribed pointer sensor outputs taken from the last orientation message received. The process waits for the next orientation message to be received (process action 1716), and upon receipt determines whether the switch state indicator included in the message indicates that the pointer's switch is still activated (process action 1718). If so, process actions 1714 through 1718 are repeated. If, however, the switch state indicator included in the message indicates that the pointer's switch has been deactivated, then it is deemed that the gesture has been completed, and in process action 1720, the recorded values are designated as the prototype sequence representing the gesture being taught to the system (process action 1722). The foregoing procedure would be repeated for each control gesture it is desired to teach to the component control system and for each electronic component it is desired to control via gesturing.

Figure 18:
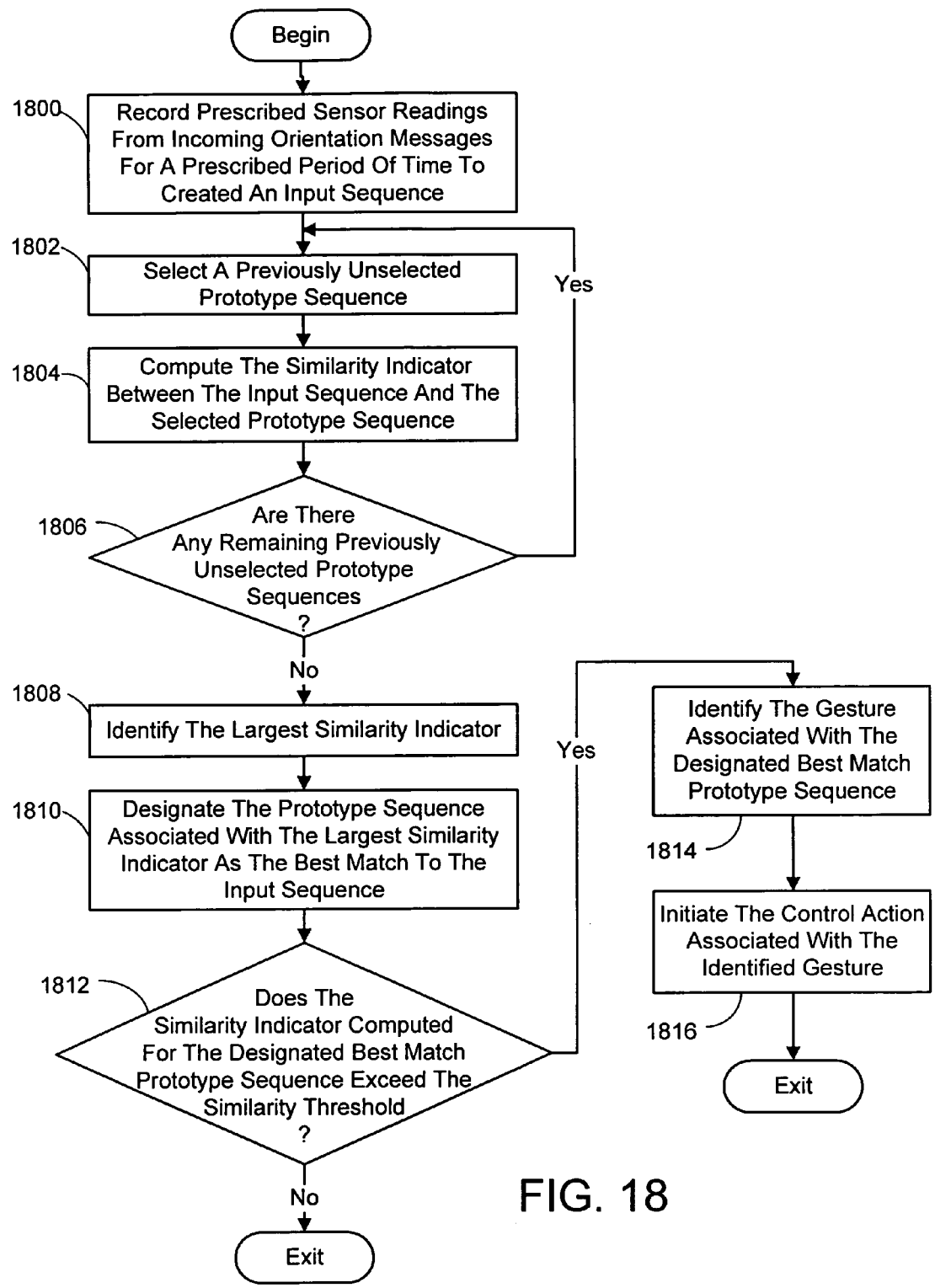
FIG. 18 depict a flow chart diagramming one process for controlling an electronic component by performing gestures with the pointer using the system of FIG. 1.

During operation, the electronic component control system constantly monitors the incoming pointer orientation messages after an object associated with a controllable electronic component has been selected, to assess whether the user is performing a control gesture applicable to that component. This gesture recognition task is accomplished as follows. Referring to FIG. 18, particular sensor readings obtained from incoming orientation messages are first recorded for a prescribed period of time to create an input sequence (process action 1800). Next, assuming more than one control gesture has been taught to the control system for the electronic component under consideration, a previously unselected one of the prototype sequences representing the various gestures applicable to the electronic component is selected (process action 1802). If only one gesture was taught to the system for the electronic component under consideration, then the associated prototype sequence for that gesture is selected. A similarity indicator is then computed between the input sequence and the selected prototype sequence (process action 1804). The similarity indicator is a measure of the similarity between the input sequence and the prototype sequence. This measure of similarity can be defined in various conventional ways. In tested versions of the control system, the similarity indicator was computed as follows.

As mentioned above, the matching process can entail not only comparing a prototype sequence to the recorded sensor values but also comparing the recorded sensor values to various versions of the prototype that are scaled up and down in amplitude and/or warped in time. In tested versions, the amplitude scaling factors ranged from 0.8 to 1.8 in increments of 0.2, and the time warping factors ranged from 0.6 to 2.0 in increments of 0.2. However, while it is believed the aforementioned scaling and warping factors are adequate to cover any reasonable variation in the gesture associated with a prototype sequence, it is noted that different ranges and increments could be used to generate the scaling and warping factors as desired. In fact the increments do not even have to be equal across the range. In practice, the prototype sequence is scaled up or down in amplitude by applying scaling factors to each value in the prototype sequence. Whereas, the prototype sequence is warped in time by applying warping factors that expand or contract the overall sequence in time.

Figure 19:
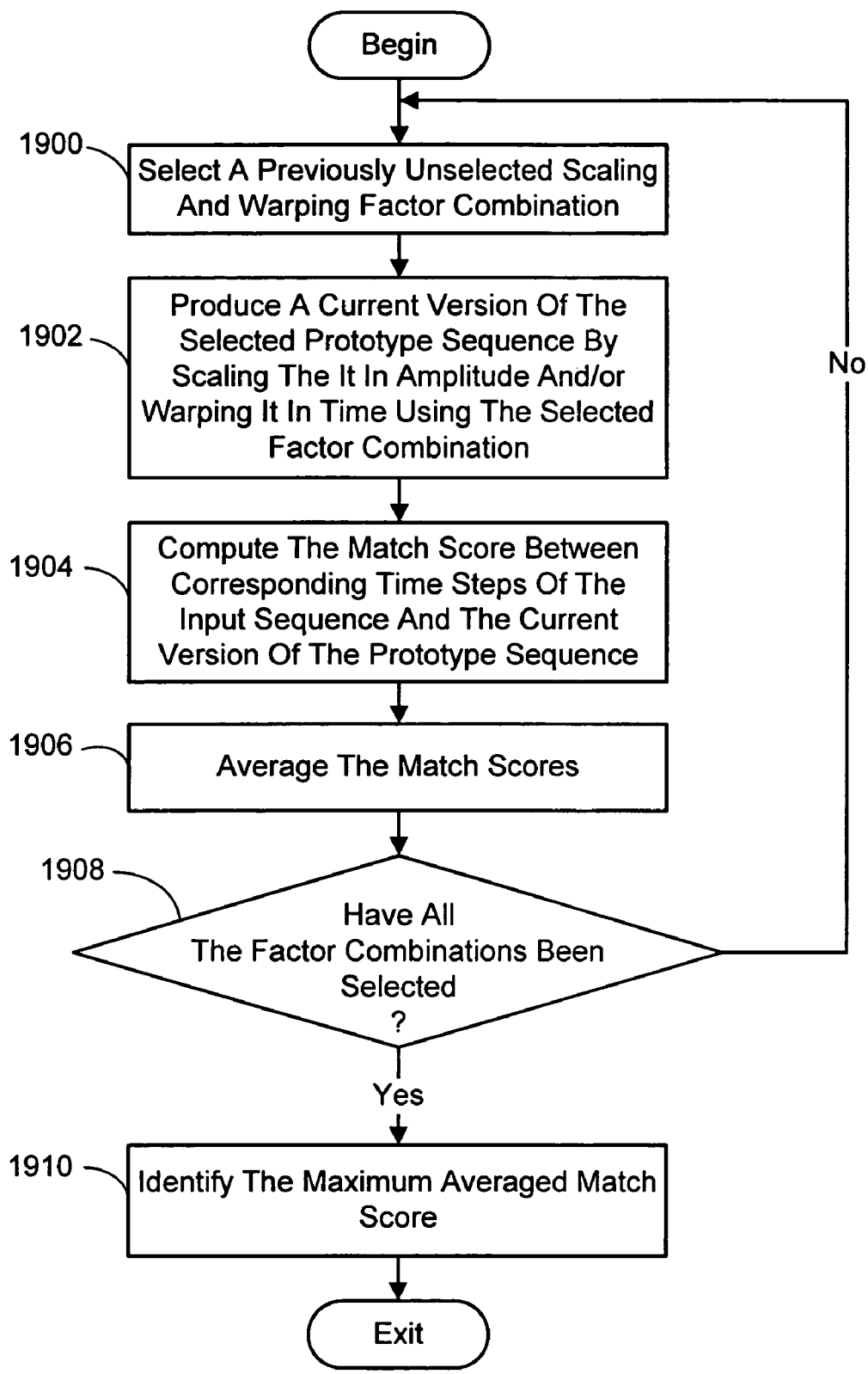
FIG. 19 depicts a flow chart diagramming a process for identifying the maximum averaged match score as used in the process of FIG. 18.

Essentially, a list is established before initiating the matching process which includes every combination of the scaling and warping factors possible, includes the case where one or both of the scaling and warping factors are zero. Note that the instance where both the scaling and warping factors are zero corresponds to the case where the prototype sequence is unmodified. Given this prescribed list, and referring now to FIG. 19, a previously unselected scaling and warping factor combination is selected (process action 1900). Next, in process action 1902, the prototype sequence is scaled in amplitude and/or warped in time using the selected factor combination to produce a current version of the selected prototype sequence (which may be the prototype sequence itself if the selected factor combination is zero scaling and zero warping). A so called "match score" is computed between corresponding time steps of the input sequence and the current version of the prototype sequence using a standard Euclidean distance technique (process action 1904). A time step refers to the prescribed sensor value or values taken from the same pointer orientation message—i.e., the value(s) captured at the same time by the pointer. Correspondence between time steps refers to computing the match score between the sensor values associated with the first time step in both sequences, then the second, and so on until the last time step of the current version of the prototype sequence is reached. Once all the match scores have been computed they are summed and divided by the number of time steps involved, thereby producing an average match score (process action 1906). Thus, the average match score $f(p_i(w,s),x)$ based on the aforementioned Euclidean distance function $f$ can be computed as follows:

$$f(p_i(w, s), x) = \frac{1}{n}\sum_i \sqrt{(p_i(w, s, t) - x(t))^T (p_i(w, s, t) - x(t))} \quad (11)$$

for selected warp w and scale s, where $p_i(w,s,t)$ is the recorded sensor value(s) at time step t of the current version of the selected prototype sequence i, x(t) refers to the corresponding sensor values of the input sequence at time step t, and n refers to the length of the current version of the selected prototype sequence $p_i(w,s)$ and so the length of x as well, The foregoing process is then repeated for every other combination of the warp and scale factors.

Specifically, it is determined if all the warp and scale factor combinations from the prescribed list have been selected (process action 1908). If not, the process actions 1900 through 1908 are repeated. Once an average match score has been computed for every version of the prototype sequence (including the unmodified sequence), the maximum averaged match score is identified (process action 1910). This maximum averaged match score is the aforementioned similarity indicator for the selected prototype sequence.

Referring once again to FIG. 18, the similarity indicator is then computed for each remaining prototype sequence by first determining if there are any remaining unselected prototype sequences (process action 1806). If so, then process actions 1802 through 1806 are repeated. When a similarity indicator has been computed for every prototype sequence, it is next determined which of the similarity indicators is the largest (process action 1808). The prototype sequence associated with the largest similarity indicator is designated as the best match to the input sequence (process action 1810). The gesture associated with the designated prototype sequence is the most likely of the gestures the system has been trained for to match the pointer movements as represented by the input sequence. However unless the similarity is great enough, it might just be that the pointer movements are random and do not match any of the trained gestures. This situation is handled by ascertaining if the similarity indicator of the designated prototype sequence exceeds a prescribed similarity threshold (process action 1812). If the similarity indicator exceeds the threshold, then it is deemed that the user has performed the gesture associated with that designated prototype sequence. As such, the gesture is identified (process action 1814), and the control action associated with that gesture is initiated by the host computer (process action 1816). However, if the similarity indicator does not exceed the threshold, no control action is initiated. The foregoing process is then repeated continuously for each consecutive block of sensor values obtained from the incoming orientation messages having the prescribed length for as long as the object associated with the electronic component under consideration remains selected.

It is noted that the aforementioned prescribed length of the input sequence is made long enough to ensure that the distinguishing characteristics of each gesture are captured therein. This aids in making sure only one gesture is recognized when several gestures are employed in the system to initiate different control actions. In tested versions of the present system employing the foregoing match score procedure this means making the input sequence as long as the longest of the scaled and warped version of the prototype sequence. The aforementioned match score threshold is chosen similarly in that it is made large enough to ensure that the distinguishing characteristics of a gesture as captured in the prototype sequence actually exist in the input sequence, and that the final match score computed for any other prototype sequence associated with another gesture not having these distinguishing characteristics will not exceed the threshold.

As to the specific sensor output or outputs that are used to construct the prototype sequences and the input sequence, any combination of the accelerometer, magnetometer and gyroscope outputs contained in each orientation message can be employed. It should be noted however, that the accelerometer will not provide an output indicative of the change in the yaw angle of the pointer, and the gyroscope will only provide data reflecting a change in the yaw angle of the pointer. Thus, the user could be restricted in the types of motion he or she is allowed to use in creating gesture if just the accelerometer or gyroscope outputs are employed in the aforementioned sequences. Using fewer output values to characterize the gesture could result in lower processing costs in comparing the prototype and input sequences. However, to give the user complete freedom in choosing the types of motion used to define a gesture, both the accelerometer and gyroscope outputs, or the magnetometer outputs, would have to be included in the sequences. In addition, while the processing costs would be higher, using the outputs from all three sensors could provide better accuracy in characterizing the gesture motions.

The foregoing prototype matching approach has the advantage of allowing the electronic component control system to be trained to recognized gestures choreographed by the user, rather than requiring prescribed gestures to be used. In addition, the user can make the gesture as simple or as complex as he or she desires. A drawback of this approach however is that runtime variations of the gesture may involve more than simple scaling of amplitude and linear time warps. Pattern recognition techniques that incorporate multiple training examples, such as hidden Markov models (HMMs) [8], may capture other important variations that may be seen in runtime. However, such techniques model only those variations present in the training data, and so would require the user to perform the desired gesture over and over during the training process—perhaps to the point of making the procedure unacceptably tedious. In addition, for gestures having a short duration, HMMs often give many false positives due to their nonlinear time warping abilities. Thus, the use of a HMM approach should be limited to user-created gestures having longer durations.

In regard to the use of simple and short duration gestures, such as for example a single motion up, down or to either side, an opportunity exists to employ a simplified and perhaps more robust approach to gesture recognition. For such gestures, a recognition strategy can be employed that looks for trends or peaks in one or more of the sensor values output by the pointer. For example, pitching the pointer up may be detected by simply thresholding the output of the accelerometer corresponding to pitch.

In this case, the system is preprogrammed with gesture threshold definitions. Each of the definitions corresponds to a predefined threshold applicable to a particular single sensor output or a set of thresholds applicable to a particular group of sensor outputs. Each definition is associated in the process to a particular gesture, which is in turn known to the system to represent a call for a particular control action to be applied to a particular electronic component that is controllable by the host computer. The thresholds are designed to indicate that the pointer has been moved in a particular direction with an excursion from a starting point which is sufficient to ensure the gesture associated with the threshold or thresholds has occurred. The starting point could be any desired, but for practical reasons, the starting point in tested versions of the present control system was chosen to be with the pointer pointed at the selected object. Thus, it was necessary for the user to point the pointing at the selected object. Pointing at an object establishes a local coordinate system around the object, so that "up", "down", "left" and "right" are relative to where the object appears to the user. For example, "up" in the context of a standing user pointing at an object on the floor means pitching up from a pitched down position, and so on.

It would be possible for the electronic component control system to determine when the user is pointing at the selected object using the procedures described above in connection with determining what the pointer is pointing at for the purpose of selecting that object. However, a simpler method is to have the user depress the button on the pointer whenever he or she is pointing at the object and wants to control the associated electronic device using a gesture. Requiring the user to depress the button while gesturing allows the system to easily determine when a gesture begins. In other words, the system records sensor values only after the user depresses the button, and thus gives a natural origin from which to detect trends in sensor values.

Recognizing gestures using a thresholding technique relies on the gestures being simple and of a short duration. One straightforward way of accomplishing this would be to restrict the gestures to a single movement of the pointer in a prescribed direction. For example, one gesture could be to rotate the pointer upward (i.e., pitch up), while another gesture could be to rotate the pointer downward (i.e., pitch down). Other examples of appropriate gestures would be to pan the pointer to the right (i.e., increase the yaw angle), or to the left (i.e., decrease the yaw angle). The sensor output or outputs used to establish the gesture threshold definitions and to create the input sequence to be discussed shortly are tailored to the gesture. Thus, the accelerometer and/or the magnetometer outputs would be an appropriate choice for the pitch up or pitch down gesture, while the gyroscope output would not. Similarly, the gyroscope and/or the magnetometer outputs would be an appropriate choice for the side-to-side gesture (i.e., changing the yaw angle), while the accelerometer output would not. In general, when a simple one directional gesture is employed to represent a control action, the sensor output or outputs that would best characterize that motion are employed to establish the threshold definitions and the input sequence.

Figure 20A:
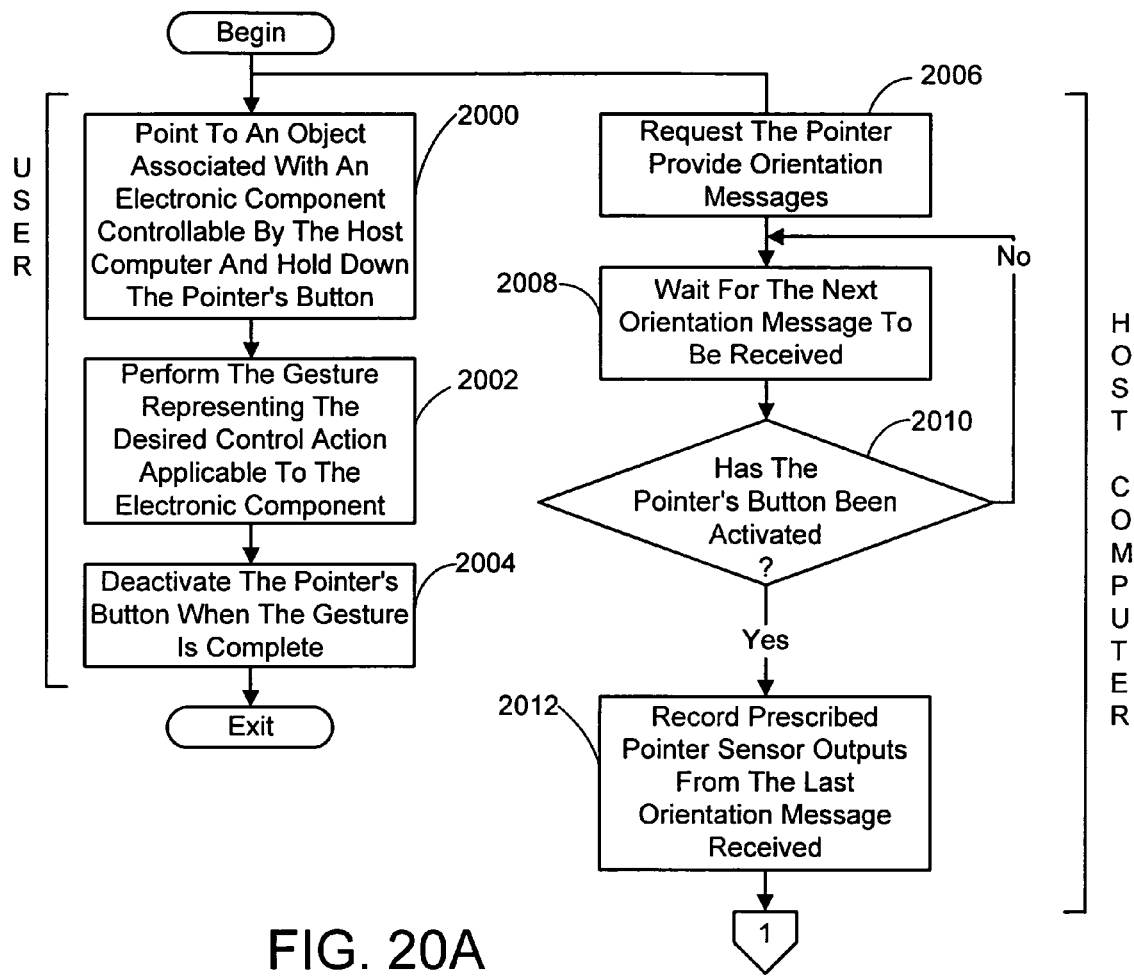
FIGS. 20A-B depict a flow chart diagramming another process for controlling an electronic component by performing gestures with the pointer using the system of FIG. 1.
Figure 20B:
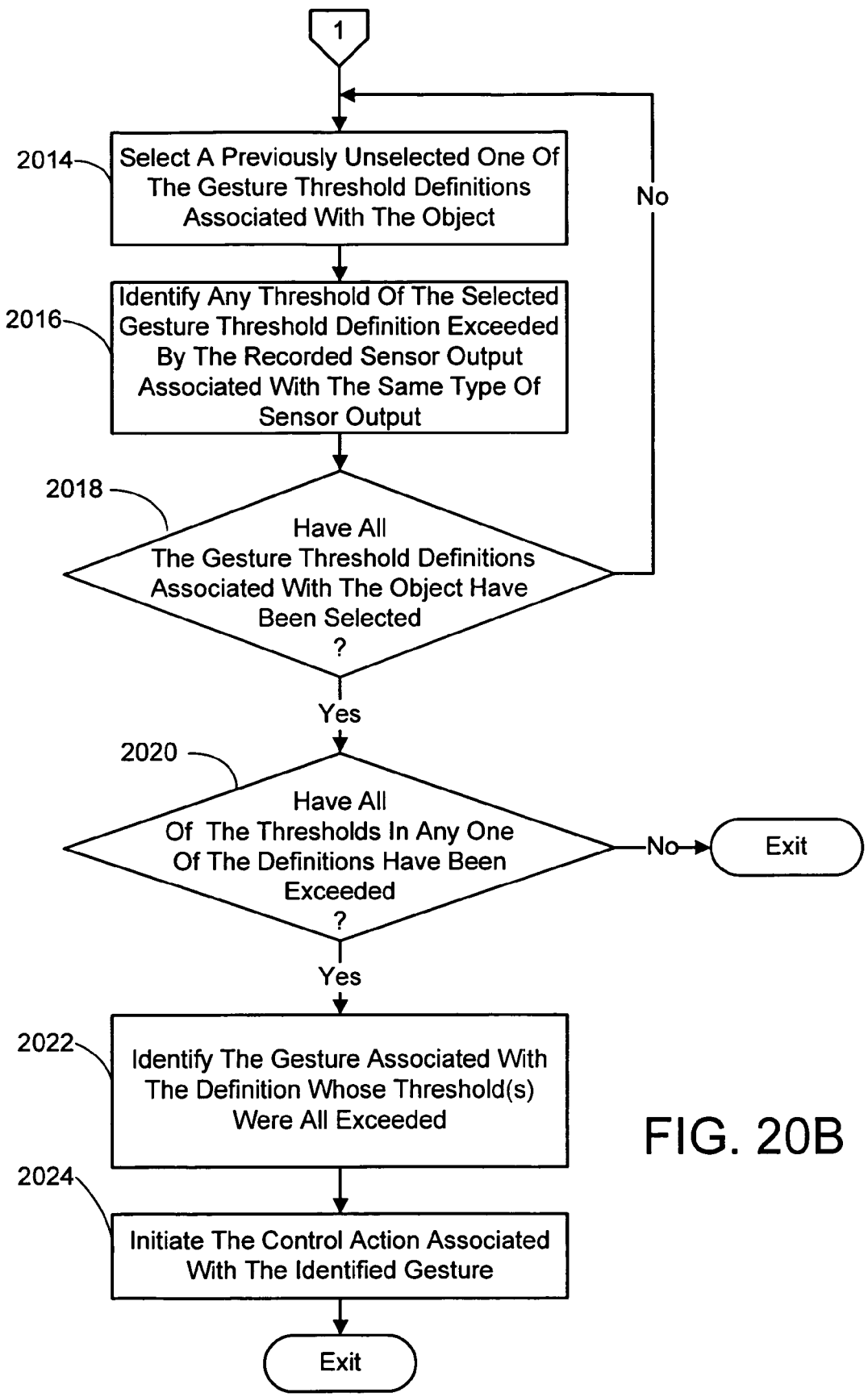

Given the foregoing ground rules, a procedure for gesture recognition based on a thresholding technique will now be described in reference to FIGS. 20A and B. The procedure begins with the user pointing to a previously selected object in the environment that is associated with an electronic component controllable by the host computer and holding down the pointer's button (process action 2000). The user then performs the particular gesture associated with the electronic component that corresponds to the desired control action (process action 2002). Finally, once the gesture is complete, the user releases the pointer's button (process action 2004). Meanwhile, the periodic requests directing the pointer to provide orientation messages continue to be sent in the manner described previously (process action 2006). The gesture recognition process waits for an orientation message to be received (process action 2008), and upon receipt determines whether the switch state indicator included in the message indicates that the pointer's button is activated (process action 2010). If not, process actions 2008 and 2010 are repeated. When, it is discovered that the button state indicator indicates the button is activated, then in process action 2012, prescribed pointer sensor outputs from the orientation message are recorded. Then, a previously unselected one of the gesture threshold definitions associated with the selected object is selected (process action 2014). Next, any threshold of the selected gesture threshold definition exceeded by the recorded sensor outputs applicable to the threshold (i.e., associated with the same sensor output) is identified (process action 2016). There may be more than one. It is then ascertained if all the gesture threshold definitions associated with the selected object have been selected and processed (process action 2018). If not, process actions 2014 through 2018 are repeated until all the definitions have been processed. At this point, it is determined if all of the thresholds in one of the definitions have been exceeded (process action 2020). If so, then it is deemed that the user has performed the gesture associated with that definition. As such, the gesture is identified (process action 2022), and the control action associated with that gesture is initiated by the host computer (process action 2024). If not, then no control action is initiated. It is noted that this latter result will only occur if the user improperly performed the desired gesture procedure or if noise in the system prevented accurate sensor readings from reaching the host computer.

3.0 MULTIMODAL INTEGRATION

The complementary nature of speech and gesture is well established. It has been shown that when naturally gesturing during speech, people will convey different sorts of information than is conveyed by the speech [4]. In more designed settings such as interactive systems, it may also be easier for the user to convey some information with either speech or gesture or a combination of both. For example, suppose the user has selected an object as described previously and that this object is a stereo amplifier controlled via a network connection by the host computer. Existing speech recognition systems would allow a user to control the volume by, for example, saying "up volume" a number of times until the desired volume is reached. However, while such a procedure is possible, it is likely to be more efficient and precise for the user to turn a volume knob on the amplifier. This is where the previously described gesture recognition system can come into play. Rather than having to turn a physical knob on the amplifier, the user would employ the pointer to control the volume by, for example, pointing at the stereo and rolling the pointer clockwise or counterclockwise to respectively turn the volume up or down. The latter procedure can provide the efficiency and accuracy of a physical volume knob, while at the same time providing the convenience of being able to control the volume remotely as in the case of the voice recognition control scheme. This is just one example of a situation where gesturing control is the best choice, there are others. In addition, there are many situations where using voice control would be the best choice. Still further, there are situations where a combination of speech and gesture control would be the most efficient and convenient method. Thus, a combined system that incorporates the previously described gesturing control system and a conventional speech control system would have distinct advantages over either system alone.

To this end, the present invention includes the integration of a conventional speech control system into the gesture control and pointer systems which results in a simple framework for combining the outputs of various modalities such as pointing to target objects and pushing the button on the pointer, pointer gestures, and speech, to arrive at a unified interpretation that instructs a combined environmental control system on an appropriate course of action. This framework decomposes the desired action (e.g., "turn up the volume on the amplifier") into a command (i.e., "turn up the volume") and a referent (i.e., "the amplifier") pair. The referent can be identified using the pointer to select an object in the environment as described previously or using a conventional speech recognition scheme, or both. The command may be specified by pressing the button on the pointer, or by a pointer gesture, or by a speech recognition event, or any combination thereof.

Interfaces that allow multiple modes of input are called multimodal interfaces. With this multimodal command/referent representation, it is possible to effect the same action in multiple ways. For example, all the following pointing, speech and gesture actions on the part of the user can be employed in the present control system to turn on a light that is under the control of the host computer:

a). Say "turn on the desk lamp";
   b) Point at the lamp with the pointer and say "turn on";
   c) Point at the lamp with the pointer and perform a "turn on" gesture using the pointer;
   d) Say "desk lamp" and perform the "turn on" gesture with the pointer;
   e). Say "lamp", point toward the desk lamp with the pointer rather than other lamps in the environment such as a floor lamp, and perform the "turn on" gesture with the pointer;
   f). Point at the lamp with the pointer and press the pointer's button (assuming the default behavior when the lamp is off and the button is clicked, is to turn the lamp on).

By unifying the results of pointing, gesture recognition and speech recognition, the overall system is made more robust. For example, a spurious speech recognition event of "volume up" while pointing at the light is ignored, rather than resulting in the volume of an amplifier being increased, as would happen if a speech control scheme were being used alone. Also consider the example given above where the user says "lamp" while pointing toward the desk lamp with the pointer rather than other lamps in the environment, and performing the "turn on" gesture with the pointer. In that example just saying lamp is ambiguous, but pointing at the desired lamp clears up the uncertainty. Thus, by including the strong contextualization provided by the pointer, the speech recognition may be made more robust [5].

The speech recognition system employed in the tested versions of the present invention is Microsoft Corporation's Speech API (SAPI), which employs a very simple command and control (CFG) style grammar, with preset utterances for the various electronic components and simple command phrases that apply to the components. The user wears a wireless lapel microphone to relay voice commands to a receiver which is connected to the host computer and which relays the received speech commands to the speech recognition system running on the host computer.

There is still a question as to how to take in the various inputs from the pointer, gesture recognition and speech recognition events, some of which may be complementary or even contradictory, and best determine what action the user wants performed and on what electronic component. While various computational frameworks could be employed, the multimodal integration process employed in the present control system uses a dynamic Bayes network [6] which encodes the various ways that sensor outputs may be combined to identify the intended referent and command, and initiate the proper action.

3.1 Bayes Network

The identity of the referent, the desired command and the appropriate action are all determined by combining the outputs of the speech recognition system, gesture recognition system and pointing analysis processes using a dynamic Bayes network architecture. Bayes networks have a number of advantages that make them appropriate to this task. First, it is easy to break apart and treat separately dependencies that otherwise would be embedded in a very large table over all the variables of interest. Secondly, Bayes networks are adept at handling probabilistic (noisy) inputs. And further, the network represents ambiguity and incomplete information that may be used appropriately by the system. In essence the Bayes network preserves ambiguities from one time step to the next while waiting for enough information to become available to make a decision as to what referent, command or action is intended. It is even possible for the network to act proactively when not enough information is available to make a decision. For example, if the user doesn't point at the lamp, the system might ask which lamp is meant after the utterance "lamp".

However, the Bayes network architecture is chosen primarily to exploit the redundancy of the user's interaction so as to increase confidence that the proper action is being implemented. The user may specify commands in a variety of ways, even though the designer specified only objects to be pointed to, utterances to recognize and gestures to recognize (as well as how referents and commands combine to result in action). For example, it is natural for a person to employ deictic (pointing) gestures in conjunction with speech to relay information where the speech is consistent with and reinforces the meaning of the gesture. Thus, the user will often naturally indicate the referent and command applicable to a desired resulting action via both speech and gesturing. This includes most frequently pointing at an object the user wants to affect.

The Bayes network architecture also allows the state of various devices to be incorporated to make the interpretation more robust. For example, if the light is already on, the system may be less disposed to interpret a gesture or utterance as a "turn on" gesture or utterance. In terms of the network, the associated probability distribution over the nodes representing the light and its parents, the Action and Referent nodes, are configured so that the only admissible action when the light is on is to turn it off, and likewise when it is off the only action available is to turn it on.

Still further, the "dynamic" nature of the dynamic Bayes network can be exploited advantageously. The network is dynamic because it has a mechanism by which it maintains a short-term memory of certain values in its network. It is natural that the referent will not be determined at the exact moment in time as the command. In other words a user will not typically specify the referent by whatever mode (e.g., pointing and/or speech) at the same time he or she relays the desired command using one of the various methods available (e.g., pointer button push, pointer gesture and/or speech). If the referent is identified only to be forgotten in the next instant of time, the association with a command that comes after it will be lost. The dynamic Bayes network models the likelihood of a referent or a command applying to future time steps as a dynamic process. Specifically, this is done via a temporal integration process in which probabilities assigned to referents and commands in the last time step are brought forward to the current time step and are input along with new speech, pointing and gesture inputs to influence the probability distribution computed for the referents and commands in the current time step. In this way the network tends to hold a memory of a command and referent which decays over time, and it is thus unnecessary to specify the command and referent at exactly the same moment in time. It is noted that in the tested implementation of the Bayes network, this propagation occurred four times a second.

Figure 21:
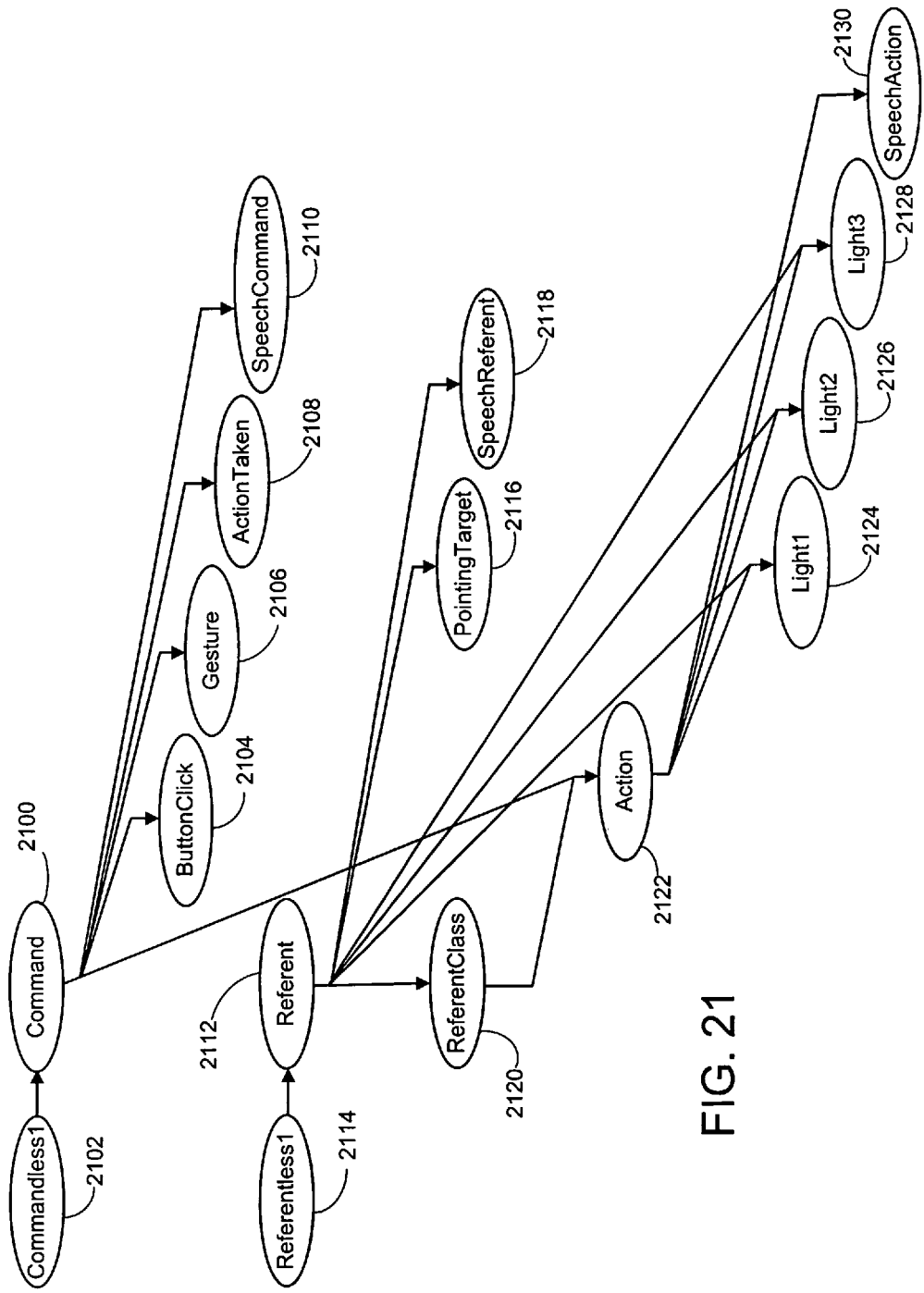
FIG. 21 is a network diagram illustrating a dynamic Bayes network used to integrate inputs from the system of FIG. 1 (both via pointing and gesturing), speech, past beliefs and electronic component states to determine the desired referent and command, and then to use these determinations, along with the component state information, to determine an appropriate action for affecting a selected electronic component.

An example of a Bayes network architecture implemented for the present electronic component control system is shown in FIG. 21. As can be seen, the command node 2100 which is essentially a list of probabilities that a command recognizable to the system is the command the user wants to implement, is influenced by input from a CommandLess 1 node 2102 representing the previous command probability distribution from the last time step. In addition, the command node 2100 is also influenced by inputs from other nodes indicating that the pointer button is activated (ButtonClick node 2104), a particular gesture has been performed (Gesture node 2106), an action has already been taken (ActionTaken node 2108), and a particular speech command has been recognized (SpeechCommand node 2110). The ActionTaken node 2108 is set by the present program as a way to force the Command node 2100 to be cleared (i.e., to have no preference on the value of Command) once an action has been taken. In this way the Command node 2100 will not cause an action to be taken twice. Whereas, the referent node 2112, which is essentially a list of probabilities that a referent controllable by the system is the referent the user wants to affect, is influenced by input from a ReferentLess 1 node 2114 representing the previous referent probability distribution from the last time step.

In addition, the referent node 2112 is also influenced by inputs from other nodes indicating that the user is pointing at a particular target object (PointingTarget node 2116) and that the user has specified a particular referent verbally (SpeechReferent node 2118).

The Command node 2100 and the Referent node 2112 (via a ReferentClass node 2120) in turn influence the Action node 2122, as do various device state nodes represented by Light 1 node 2124, Light 2 node 2126 and Light 3 node 2128. The ReferenctClass node 2120 maps each referent to a class type (e.g., Light 1 and Light 2 might both be "X10" type lights). This allows actions to be specified over a set of commands and the referent class (rather then each referent instance). Such an approach is an efficient way of setting up the network as typically multiple referents in an environment will work similarly. Without this node 2120, it would be necessary to specify a command and action over each referent even though they would likely be the same within the same class of devices, The device state nodes indicate the current state of a device where that information is important to the control system. For example, if the device state nodes represent the state of a light (i.e., light 1), the node could indicate if the light is on or off. It is noted that a device state node only influences the action node 2122 when the referent node 2112 indicates that the electronic component associated with the device state node is the referent. Finally, a SpeechAction node 2130 can also provide an input that influences the action node 2122 and so the action ultimately performed by the host computer. The speech action input is a way to completely specify the Action from a single utterance, thereby bypassing the whole dichotomy of Command and Referent. For example, SpeechAction node 2130 might map to a speech recognition utterance of "turn on the light" as a single unit, rather than saying "turn on" (Command) and "the light" (Referent). This node 2130 can also be useful when an utterance does not fit into the Command/Referent structure, but maps to Actions anyway. For example, the utterance "make it brighter in here" can be mapped to an Action of turning on a light, even though no specific Command or Referent was specified in the utterance.

Typically, the particular electronic component corresponding to the referent, and in many cases the particular command given by the user to affect the referent, dictate what the action is to be. However, the aforementioned device states can also play into this by restricting the number of possible actions if the device state applies to the referent. For example, assume the pointer is pointing at light 1. As a result the PointingTarget node in the Bayes network is "set" to Light 1. This causes the referent node to also be "set" to Light 1, assuming there are no other contrary influencing inputs to the node. In addition, as the referent is set to Light 1, the state of this light will influence the Action node. Assume the light is on. Also assume there are only two possible actions in this case, i.e., turn the light off if it is on, or do nothing. Thus, the possible actions are limited and so when a command in input (e.g., the speech command to "turn off"), the confidence level will be high that this is the correct action in the circumstances. This added influence on the Action node causes the probability distribution of the node to collapse to "TurnOffLight". The system then takes the appropriate action to turn off the light.

4.0 EXPERIMENTAL RESULTS

A prototype of the foregoing electronic component control system was constructed and used to control a variety of devices in a living room-like scenario. Specifically, the user was able to control the following electronic components using the pointer and a series of simple voice commands.

4.1 X10 Lighting:

A user is able to turn multiple lights in the room on and off by pointing the pointer at a light and depressing the button on the pointer. The user then utters the phrases "turn on" or "turn off", as desired to turn the light on or off. In addition, a selected light may be dimmed or brightened via gesturing by respectively rotating the pointer down or up while pointing at the light.

4.2 A Media Player Running on a Computer:

A user is also able to control a media player. Specifically, the user points the pointer at the host computer's monitor where the media player's GUI is displayed, and depresses the pointer's button to start the player or to pause it. The user can also roll the pointer to the left or right to change the volume, and can gesture up or down to move the previous or next tracks in the play list. "Volume up", "volume down", "next" and "previous" utterances command the player accordingly.

4.3 Cursor Control on a Computer Monitor:

A user can point at a computer display and click the pointer's button to give control of the cursor to the pointer. The cursor is then moved around the display's screen by pointing the pointer around the screen [7]. The pointer's button acts as the left mouse button. Clicking on a special icon in the corner of the display exits the cursor control mode.

4.4 Color Kinetics Lights:

A user can also point the pointer at a special computer controlled arrays of red, green, and blue lights to brighten them over time. When the user points away, the color gradually decays. Rolling the pointer to the left or right changes the red, green and blue combination sent to the light, changing the lights color.

5.0 FEEDBACK FEATURES

It is noted that for the prototype system, an audio feedback scheme was employed where an audible sound was generated by the host computer when the selected target changes. This audio feedback assures the user that the desired object has been selected, and therefore assists in the selection process. In addition, one of the aforementioned visible spectrum LEDs on the pointer (in this case the green one) was lit via a command from the host computer when the pointer was pointing at an object known to the system.

It is noted that this feedback feature could be expanded beyond that implemented in the prototype. The pointer described previously preferably has two differently colored visible spectrum LED with which to provide feedback to the user. For example, these could be used to indicate to the user that an input of some kind was not understood by the component control system. Thus, if for instance the voice recognition system did not understand a command or an identification of a referent, the control system could cause one of the visible LEDs (e.g., the red one) to light up. The visible spectrum LEDs could even be used to provide the status of a device associated with an object that the user has selected. For instance, one of the LEDs could be illuminated to indicate the device was on, while the other would indicate the device was off. Or, for example, the intensity of one of the LEDs could be varied in proportion to volume setting on a stereo amplifier. These are just a few examples of the types of feedback that the visible spectrum LEDs can provide, many others are possible.

6.0 REFERENCES

[1] Jojic, N., B. Brummitt, B. Meyers, S. Harris, and T. Huang, Estimation of Pointing Parameters in Dense Disparity Maps. in *IEEE Intl. Conf. on Automatic Face and Gesture Recognition*, (Grenbole, France, 2000).

[2] Priyantha, N. B., Anit Chakraborty, Hari Balakrishnan, The Cricket Location-Support System. in *Proceedings 6th ACM MOBICOM*, (Boston, Mass., 2000).

[3] Randell, C., and Henk Muller, Low Cost Indoor Positioning System. in *Ubicomp* 2001: *Ubiquitous Computing*, (Atlanta, Ga., 2001), Springer-Verlag, 42-48.

[4] MacNeil, D. *Hand and Mind*. University of Chicago Press, 1992.

[5] Oviatt, S. L. Taming Speech Recognition Errors Within a Multimodal Interface. *Communications of the ACM*, 43(9). 45-51.

[6] Pearl, J. *Probabilistic Reasoning in Intelligent Systems*. Morgan Kaufmann, San Mateo, Calif., 1988.

[7] Olsen, D. R. J., T. Nielsen, Laser Pointer Interaction. in *Proceedings CHI'2001: Human Factors in Computing Systems*, (Seattle, 2001), 17-22.

[8] Rabiner, L. R., Juang B. H., An Introduction To Hidden Markov Models. IEEE ASSP Magazine (January 1986) 4-15.

Wherefore, what is claimed is:

1. A multimodal system for controlling electronic components, comprising:
    a general purpose computing system which is in communication with said electronic components via a computer network, said electronic components being separate from the computing system;
    a computer program comprising program modules executable by the computing system, said program modules comprising:
        an object selection module that identifies an object selected by a user via a pointing device associated with at least one camera and at least one light-emitting diode (LED),
        a gesture recognition module that recognizes one or more motions of the pointing device in three-dimensional space, the pointing device associated with at least one accelerometer, and
        a speech control module that identifies a component selected by a user,
        each of the object selection module, the gesture recognition module, and the speech control module providing inputs to an integration module that integrates said inputs to arrive at a unified interpretation of what object the user wants to control and what control action is desired.

2. The system of claim 1, wherein the integration module comprises a dynamic Bayes network which determines from the individual inputs of the object selection module, gesture recognition module, and speech control module, the identity of a component the user wants to control (i.e., the referent), a command that the user wishes to implement (i.e., the command), and the appropriate control action to be taken to affect the identified referent in view of the command.

3. A computer-implemented multimodal electronic component control process comprising:
    a pointer-based object selection process module,
    a gesture recognition process module that recognizes one or more motions of a pointing device in three-dimensional space, the pointing device being associated with one or more accelerometers, and
    a speech control process module that identifies a command a user desires to implement,
    each of the pointer-based object selection process module, the gesture recognition process module, and the speech control process module providing inputs to an integration process module that integrates the inputs to arrive at a unified interpretation of what component a user wants to control and what control action is desired, wherein the electronic component being controlled is separate from a computer system implementing the multimodal electronic component control process and is in communication with the computer system via a computer network.

4. The process of claim 3, wherein integration process module is a dynamic Bayes network.

5. The process of claim 4, wherein the dynamic Bayes network determines from the individual inputs of the object selection module, gesture recognition module, and speech control module, the identity of a component the user wants to control (i.e., the referent), a command that the user wishes to implement (i.e., the command), and the appropriate control action to be taken to affect the identified referent in view of the command.

6. A computer-readable storage medium having computer-executable instructions for causing a computer system to control electronic components using multimodal integration, said computer-executable instructions comprising:
    accepting inputs from:
        a pointer-based object selection process module that identifies an electronic component selected by a user via a pointing device in association with at least one camera and at least one light-emitting diode that are used for identifying the electronic component selected by the user,
        a gesture recognition process module that recognizes one or more motions performed by the user in three-dimensional space via the pointing device in association with at least one accelerometer that is used for detecting motion of the pointing device, and
        a speech control process module that identifies the electronic component the user desires to manipulate and a command the user desires to implement;
    integrating said inputs from the pointer-based object selection process module and the speech control process module to arrive at a unified interpretation of what electronic component the user wants to control; and
    integrating said inputs from the gesture recognition process module and the speech control process module to arrive at a unified interpretation of what control action is desired, wherein the electronic components being controlled are separate from the computer system but are in communication with the computer system via a computer network.

7. The computer-readable storage medium of claim 6, wherein the instruction for accepting inputs, comprises a sub-instruction for inputting from the object selection process module an indication as to what electronic component a user wants to affect via a network connection to a host computer based on what object a pointer is being pointed at, wherein the object corresponds to, or is associated with, the indicated electronic component.

8. The computer-readable storage medium of claim 6, wherein the instruction for accepting inputs, comprises a sub-instruction for inputting from the object selection process module an indication as to whether a user-activated switch on the pointer has been activated.

9. The computer-readable storage medium of claim 6, wherein the instruction for accepting inputs, comprises a sub-instruction for inputting from the gesture recognition process module an indication of what command the user wants implemented based on a gesture performed by the user.

10. The computer-readable storage medium of claim 6, wherein the instruction for accepting inputs, comprises a sub-instruction for inputting from the speech control process module an indication as to what electronic component a user wants to affect via a network connection to a host computer based on a word or phase spoken by the user.

11. The computer-readable storage medium of claim 6, wherein the instruction for accepting inputs, comprises a sub-instruction for inputting from the speech control process module an indication as to what command the user wants implemented based on a word or phase spoken by the user.

12. A computer-readable storage medium having computer-executable instructions for causing a computer system to control an object associated with an electronic component using multimodal integration, said computer-executable instructions comprising:

accepting inputs from:
- a pointer-based object selection module that identifies the object selected by a user via a pointing device in three-dimensional space,
- a gesture recognition module that recognizes one or more motions of the pointing device in three-dimensional space, and
- a speech control module that recognizes speech indicating the object a user desires to manipulate and a command the user desires to implement,
- wherein the pointing device is associated with one or more cameras, one or more light-emitting diodes (LEDs), and one or more accelerometers;

integrating said inputs from the pointer-based object selection module and the speech control module to arrive at a unified interpretation of what object the user wants to control; and integrating said inputs from the gesture recognition module and the speech control module to arrive at a unified interpretation of what control action is desired by the user.

* * * * *

UNITED STATES PATENT AND TRADEMARK OFFICE
CERTIFICATE OF CORRECTION

PATENT NO. : 7,596,767 B2  Page 1 of 1
APPLICATION NO. : 11/156873
DATED : September 29, 2009
INVENTOR(S) : Andrew Wilson It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 778 days.

Signed and Sealed this

Twenty-eighth Day of September, 2010

David J. Kappos
*Director of the United States Patent and Trademark Office*